(12) United States Patent
Diasti et al.

(10) Patent No.: US 10,924,615 B1
(45) Date of Patent: Feb. 16, 2021

(54) CLOUD-BASED SCANNING SYSTEMS AND REMOTE IMAGE PROCESSING METHODS

(71) Applicant: Starfish Technologies LLC, Houston, TX (US)

(72) Inventors: Stefan Diasti, Houston, TX (US); Fiyyaz Pirani, Houston, TX (US)

(73) Assignee: Starfish Technologies LLC, Houston, TX (US)

( * ) Notice: Subject to any disclaimer, the term of this patent is extended or adjusted under 35 U.S.C. 154(b) by 0 days.

(21) Appl. No.: 16/592,740

(22) Filed: Oct. 3, 2019

(51) Int. Cl.
H04N 1/00 (2006.01)

(52) U.S. Cl.
CPC ....... *H04N 1/00225* (2013.01); *H04N 1/0044* (2013.01); *H04N 1/00411* (2013.01)

(58) Field of Classification Search
CPC ........... H04N 1/00225; H04N 1/00411; H04N 1/0044
USPC ....................................................... 358/1.15
See application file for complete search history.

(56) References Cited

U.S. PATENT DOCUMENTS

| | | |
|---|---|---|
| 6,903,833 B1 | 6/2005 | Murata |
| 10,146,750 B2 | 12/2018 | Deng |
| 10,395,772 B1 | 8/2019 | Lucas et al. |
| 10,432,807 B1 | 10/2019 | Li et al. |
| 2003/0072031 A1 | 4/2003 | Kuwata et al. |
| 2006/0170960 A1 | 8/2006 | Koike |
| 2007/0216960 A1 | 9/2007 | Ohtani |
| 2008/0016449 A1 | 1/2008 | Ookuma |
| 2008/0239329 A1* | 10/2008 | Kitada ............... H04N 1/00244 358/1.1 |
| 2008/0301261 A1 | 12/2008 | Nakazawa |
| 2010/0325000 A1 | 12/2010 | Teraoka |
| 2012/0185913 A1 | 7/2012 | Martinez |
| 2012/0198521 A1 | 8/2012 | Urakawa |
| 2013/0060645 A1 | 3/2013 | Baladi |
| 2013/0135640 A1 | 5/2013 | Nagasaki |
| 2013/0141743 A1 | 6/2013 | Miyazawa et al. |
| 2014/0071482 A1 | 3/2014 | Ishibashi |
| 2014/0192380 A1 | 7/2014 | Tawada |
| 2014/0201148 A1 | 7/2014 | Doui et al. |
| 2014/0240775 A1 | 8/2014 | Suzuki et al. |
| 2015/0100627 A1 | 4/2015 | Benke |
| 2015/0181054 A1 | 6/2015 | Hayakawa |
| 2015/0324235 A1 | 11/2015 | Engholm et al. |

(Continued)

*Primary Examiner* — Saeid Ebrahimi Dehkordy
(74) *Attorney, Agent, or Firm* — Jennings, Strouss & Salmon PLC; Daniel R. Pote

(57) ABSTRACT

A cloud-based document scanning system includes a cloud computing platform having a cloud computing application and a cloud storage system. The system further includes a scanning device communicatively coupled over a network to the cloud computing platform, the scanning device configured to: accept a set of documents; generate a set of digital image files corresponding to the set of documents; store the set of digital image files; and upload the set of digital image files directly to the cloud storage system. Upon receiving a request from the scanning device, the cloud computing application is configured to: access the set of digital image files; apply image processing operations to the set of digital image files in accordance with a plurality of image processing parameters, generate a portable document format document based on the processed image files, and send the portable document format document to a user-selected destination.

18 Claims, 9 Drawing Sheets

(56) References Cited

U.S. PATENT DOCUMENTS

| | | |
|---|---|---|
| 2015/0358487 A1 | 12/2015 | Sugiyama |
| 2016/0006568 A1 | 3/2016 | Saito |
| 2016/0065683 A1 | 3/2016 | Saito |
| 2016/0080601 A1 | 3/2016 | Miyazawa et al. |
| 2016/0366234 A1 | 12/2016 | Tokima |
| 2017/0026488 A1 | 1/2017 | Hao |
| 2017/0063607 A1 | 3/2017 | Maruyanna |
| 2017/0149829 A1 | 5/2017 | Oshurkov |
| 2017/0230444 A1 | 8/2017 | Chiang |
| 2017/0353621 A1 | 12/2017 | Saito |
| 2018/0074759 A1 | 3/2018 | Boccanfuso |
| 2018/0089202 A1 | 3/2018 | Mori |
| 2018/0101334 A1 | 4/2018 | Suzuki |
| 2018/0115680 A1 | 4/2018 | Shimamura |
| 2018/0198930 A1 | 7/2018 | Tokiwa et al. |
| 2018/0232394 A1 | 8/2018 | Danziger |
| 2018/0270367 A1 | 9/2018 | Suzuki |
| 2019/0087249 A1 | 3/2019 | Togawa |
| 2019/0246009 A1 | 8/2019 | Bermundo et al. |
| 2020/0186361 A1 | 6/2020 | Almgren et al. |

\* cited by examiner

CLOUD-BASED SCANNING SYSTEMS AND REMOTE IMAGE PROCESSING METHODS

TECHNICAL FIELD

The present invention relates, generally, to document scanning technology and, more particularly, to distributed cloud-based image processing and document management systems.

BACKGROUND

Technological improvements in the fields of cloud storage and mobile computing systems—together with a renewed emphasis on reducing paper consumption—have driven an increased interest in paperless systems by both consumers and businesses. Such paperless paradigms, which generally involve generating and storing digital versions of physical documents, provide numerous advantages, such as ubiquitous access to information, improved security (through strong encryption), automated data capture, reduced overhead, and document consolidation.

While paperless systems are advantageous in many respects, a number of significant challenges remain. For example, traditional scanning systems, such as those incorporated into conventional copy machines, tend to be bulky, expensive, and difficult to deploy. Most, in fact, require dedicated computer for set-up and operation. Furthermore, such systems do not provide a streamlined work-flow, and generally provide very few delivery options for scanned documents (i.e., typically only e-mail or a designated network folder). In addition, traditional scanning systems lack significant document editing functionality at the scanner interface.

Systems and methods are therefore needed that overcome these and other limitations of the prior art.

SUMMARY OF PREFERRED EMBODIMENTS

Various embodiments of the present invention relate to systems and methods for, inter alia: i) cloud-based document management and storage wherein at least a portion of the image processing is performed remotely from the scanning device, e.g., via a cloud computing platform; ii) a document scanner incorporating a user interface that allows the user to specify a wide range of page editing functions on the scanner device itself; iii) a document scanning device configured to automatically determine a simplex/duplex attribute of each page of a scanned document and generate a portable document format based thereon; iv) a document scanning device configured to initially request, from a cloud application programming interface (API), a set of uniform resource locators (URLs) and subsequently directly upload a set of corresponding digital image files to those URLs without accessing the cloud API; v) a document scanning system in which thumbnail images are generated automatically by serverless functions provided within a cloud computing platform upon upload of the corresponding digital image files; vi) a document scanning system in which optical character recognition is performed automatically by a cloud computing platform upon upload of the corresponding digital image files; vii) a distributed system for scanning, processing, storing, and delivering documents including a scanner and a remote application programming interface (API) configured to communicate with a cloud computing platform; viii) a scanner configured to operate a main scanner application that manages user interaction, and a middleware layer including a plurality of plug-ins that receive prompts from the main scanner application and communicate with the scanning hardware; and ix) an API configured to coordinate interaction between a scanner and a cloud-based computing platform for storing, processing, retrieving, and transmitting a finished PDF document to a user selected destination.

Various other embodiments, aspects, and features are described in greater detail below.

BRIEF DESCRIPTION OF THE DRAWING FIGURES

The present invention will hereinafter be described in conjunction with the appended drawing figures, wherein like numerals denote like elements, and:

DETAILED DESCRIPTION OF PREFERRED EXEMPLARY EMBODIMENTS

The present invention relates to improved, easy-to-use, cloud-based systems and methods for scanning, securely storing, managing, and retrieving digital documents. In accordance with various embodiments, at least a portion of the image processing is performed by a cloud-based application, rather than at the scanning device itself. The resulting electronic images can, in a streamlined fashion, be delivered to a variety of destinations, such as e-mail addresses, fax numbers, a local USB drive, or a cloud service (e.g., Raven Cloud, Google Drive, Dropbox, Box, Evernote, or the like). In that regard, the following detailed description is merely exemplary in nature and is not intended to limit the inventions or the application and uses of the inventions described herein. Furthermore, there is no intention to be bound by any theory presented in the preceding background or the following detailed description.

Figure 1:
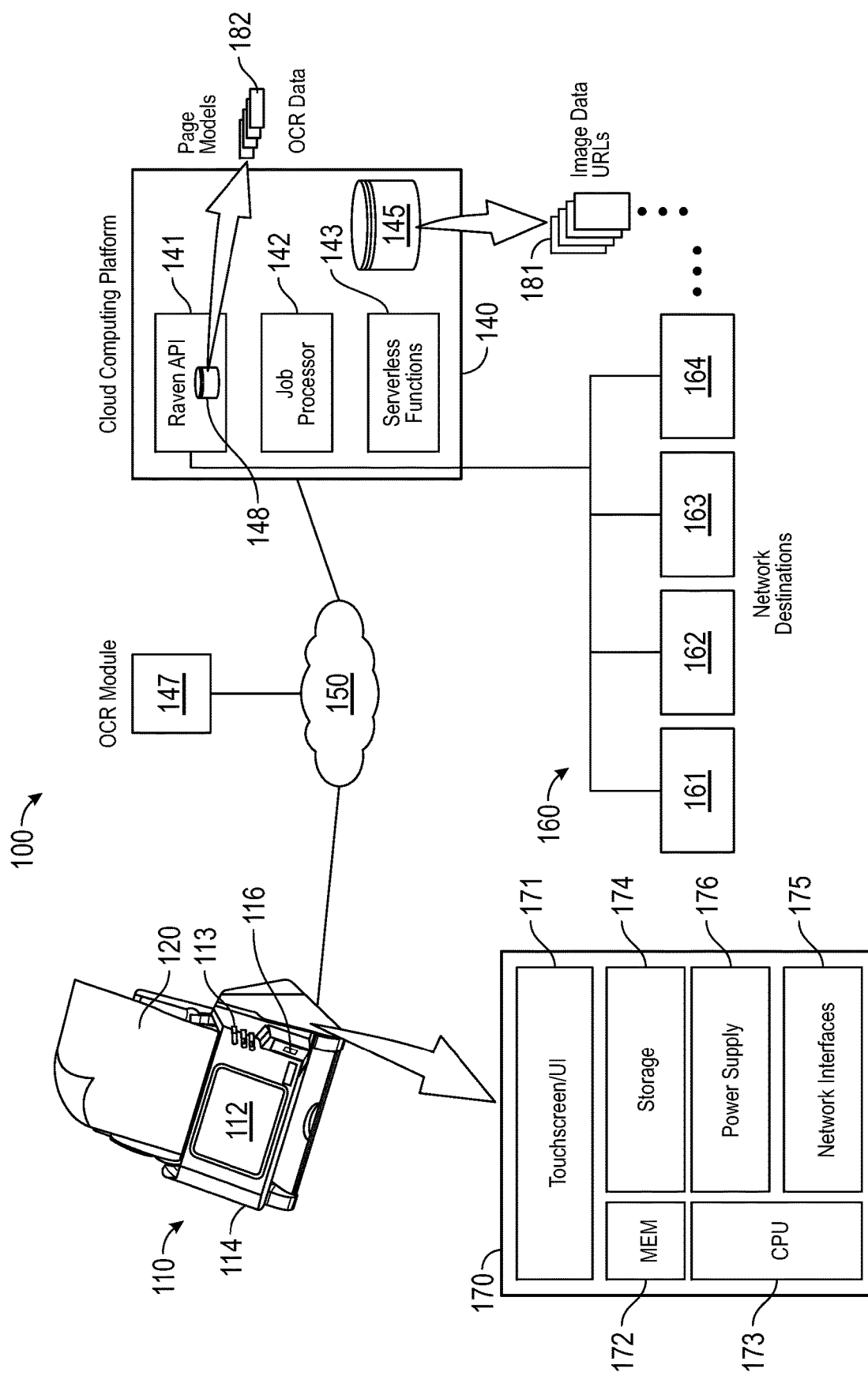
FIG. 1 is a conceptual block diagram of an exemplary system for scanning, processing, storing, retrieving, and delivering documents in accordance with various embodiments.

Referring now to FIG. 1, a cloud-based document scanning and management system (or simply "scanning system") 100 in accordance with various embodiments will now be described. As a preliminary matter, it will be understood that system 100 may incorporate a number of conventional network components, such as switches, routers, hubs, bridges, access points, gateways and the like. In the interest of clarity, such conventional components have not been illustrated in FIG. 1.

In general, system 100 includes a document scanning device ("scanning device" or simply "scanner") 110 communicatively coupled over a network 150 (e.g., the Internet)

with a cloud computing platform 140 and one or more third-party systems 147 (representing, for example, third-party servers or APIs). Various network destinations 160 representing potential endpoints for transmitting the final digitized documents are communicatively coupled to cloud computing platform 140. For example, destination 161 may correspond to an e-mail server, destination 162 may correspond to the Raven Cloud, destination 163 may correspond to Dropbox, destination 164 may correspond to Google Cloud Drive, and so on.

Scanner 110 generally includes a scanner body 114 enclosing a combination of hardware, firmware, and software configured to receive one or more documents 120 (e.g., printed pages, receipts, tickets, photos, or any other substantially flat object) and produce a corresponding digitized representation, which may take a variety of forms as described in further detail below. In one embodiment, scanner 110 incorporates an automatic document feeder (ADF) that feeds individual pages to a one or two-sided image sensor (e.g., a contact image sensor (CIS)) having an LED light source and a suitable optical resolution (e.g., about 600 dpi).

Scanner 110 includes a USB interface 116 or the like configured to accept a standard flash memory drive for storing digitized documents (i.e., as one selectable destination). Scanner 110 also includes various indicators and user interface components, such as a touch screen 112 and one or more buttons or other user-actuatable components 113. In one embodiment, touch screen 112 is a 7-inch color LCD, and buttons 113 include a "screen saver" button configured to selectably place touch screen 112 in a screen saver mode whereupon it will not accept input from the user. While not illustrated in FIG. 1, scanner 110 may also include a power cable input and an Ethernet (RJ-45) jack for wired connection to network 150 (as an alternative to WiFi, as described below).

With reference to the inset shown in FIG. 1, scanner 110 includes, typically within housing 114, a processing module 170 comprising various electronic components and software configured to accomplish the functions described herein. Thus, for example, processing module 170 includes a user interface module 171 (including, for example, touch screen 112), a central processing unit (CPU) or other processor 173, one or more memory components 172, one or more storage components 174 (e.g., a hard drive, flash memory, or the like), a power supply 176, and network interfaces 175 for connecting to network 150. Network interfaces 175 may include, for example, an Ethernet interface as well as a Wi-Fi interface (e.g., an IEEE 802.11b/g/n compliant interface). While not illustrated in FIG. 1, processing module 170 will typically also include suitable interfaces to the hardware components provided within scanner 110, such as the document feeder, the image sensor, rechargeable battery pack, and the like.

Various software components are stored (e.g., at 172 and 174) for execution by processor 173. For example, in one embodiment scanner 110 comprises two primary software modules: a main scanner application that manages user interaction, and a middleware layer that operates behind the scenes between the main scanner application and the scanner hardware. The middleware layer may include one or more plug-ins that communicate with the scanning hardware (e.g., document feeder, scanner optics, etc.). For example, when a user initiates a scan (via touch screen 112), the scanner app instructs a plug-in to cause the scanning hardware to initiate a scan.

With continued reference to FIG. 1, cloud computing platform 140 generally includes a Raven API 141, a job processor 142, cloud storage 145 (for storing various data 181) and a serverless functions module 143.

Cloud functions module 143 includes "serverless" code segments that respond to events (captured by cloud computing platform) without requiring a managed runtime environment. In an illustrated embodiment, serverless functions 143 are implemented using Google Cloud Functions. The invention is not so limited, however. Other event-driven, serverless frameworks may be used, such as AWS Lambda or the like. Furthermore, the illustrated embodiments are not limited to event-driven software. Traditional runtime applications may also be used. Accordingly, the phrases "cloud functions" and "serverless functions" are used without loss of generality.

In contrast to serverless functions 143, job processor 142 comprises server-based software components that perform, in the background, much of the computationally complex tasks described herein, such as assembling and generating the finished PDF document. In one embodiment, for example, job processor 142 is implemented using Google Compute Engine. In one embodiment, job processor 142 is substantially a server-based duplicate of Raven API 141, configured to provide substantially the same functionality, as needed in appropriate contexts.

Raven API 141 comprises a set of software components, specifications, and communication protocols configured to respond to a defined set of requests. In one embodiment, Raven API 141 is implemented using a representational state transfer (REST) architecture implemented using the Google Cloud API framework. As will be discussed in further detail below, scanner 110 (including its main scanner application and middleware layer) will generally communicate directly with Raven API 141, while serverless functions module 143 will generally react to events that occur on platform 140 and/or within cloud storage 145.

Cloud storage 145 may be implemented as a datastore configured to store data generated by various components of system 100, including, for example, raw image data, optical character recognition (OCR) data, and thumbnail images. In one embodiment, cloud storage 145 is implemented using Google Cloud Storage. Raven API 141 may store certain data (e.g., page models 182 and OCR data) within its own database 148 (e.g., a MongoDB database), or may use cloud storage 145 (and/or other ancillary data structures) for this purpose. As described in further detail below, page models 182 include metadata describing the content of the final PDF document to be produced, such as the set of URLs used to store images within cloud storage 145, the document name, the location of thumbnails, extracted text, and/or parameters specifying any edits (zoom, crop, rotate, etc.) made by the user.

Figure 2:
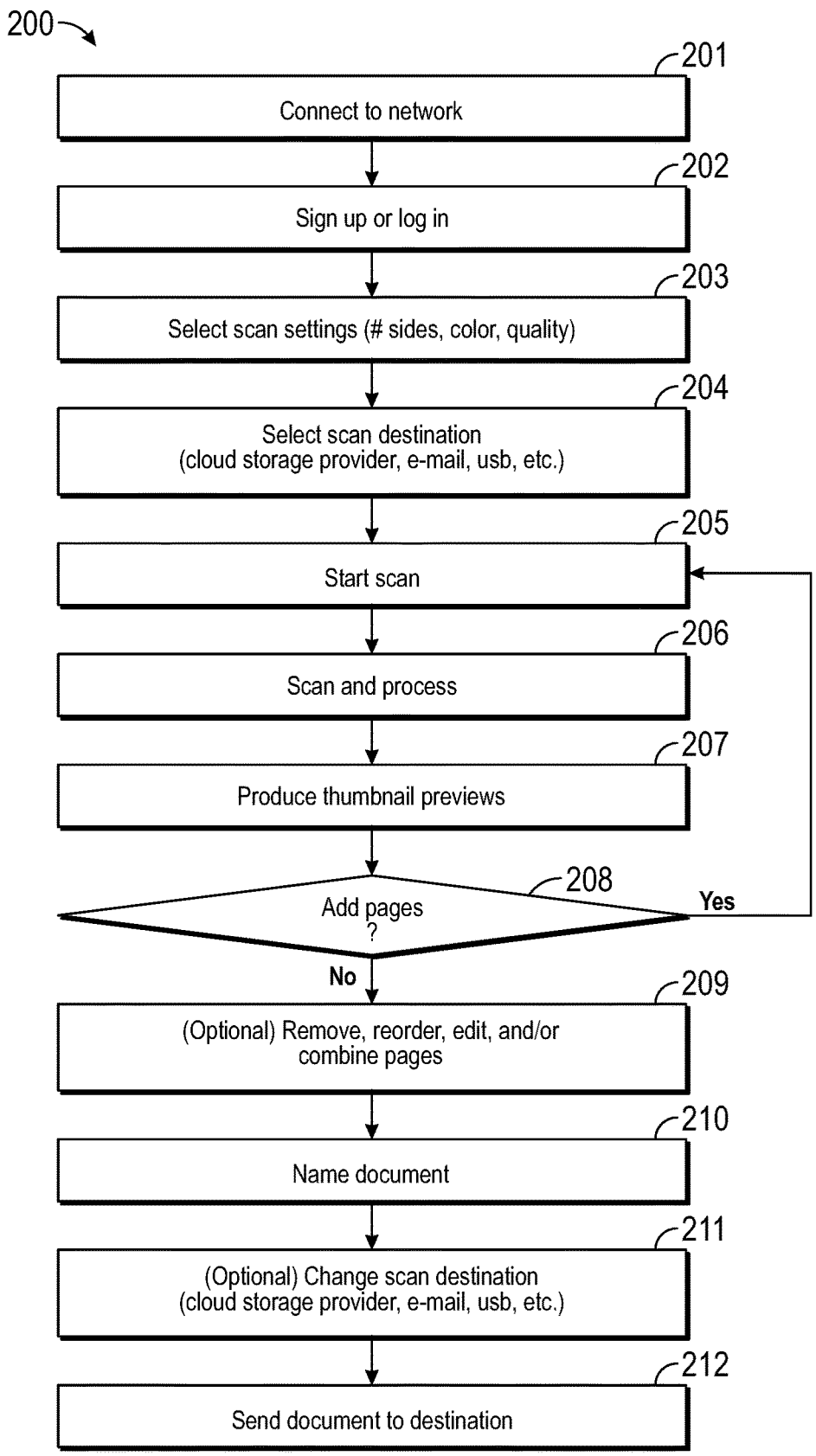
FIG. 2 is a flowchart illustrating exemplary methods for operating the system of FIG. 1 by a user in accordance with various embodiments.

FIG. 2 is a flow chart illustrating a method 200 by which a user may interact with scanner 110 in accordance with various embodiments, and will be described in conjunction with the block diagram of FIG. 1. First, at 201, the scanner 110 is suitably connected to network 150 via, for example, network interfaces 175 (i.e., via Ethernet or Wi-Fi). As mentioned above, this connection may take place via one or more intermediate network components, such as modems, gateways, access points, switches, and the like.

Next, at 202, the user is asked to sign in or, if the user does not yet have an account, sign up for the system by entering the appropriate credentials (e.g., user name and password). These user credentials may also correspond to a particular cloud storage provider, such as the Raven Cloud Storage system. The user may also be provided with a free trial account at this time.

Figure 5:
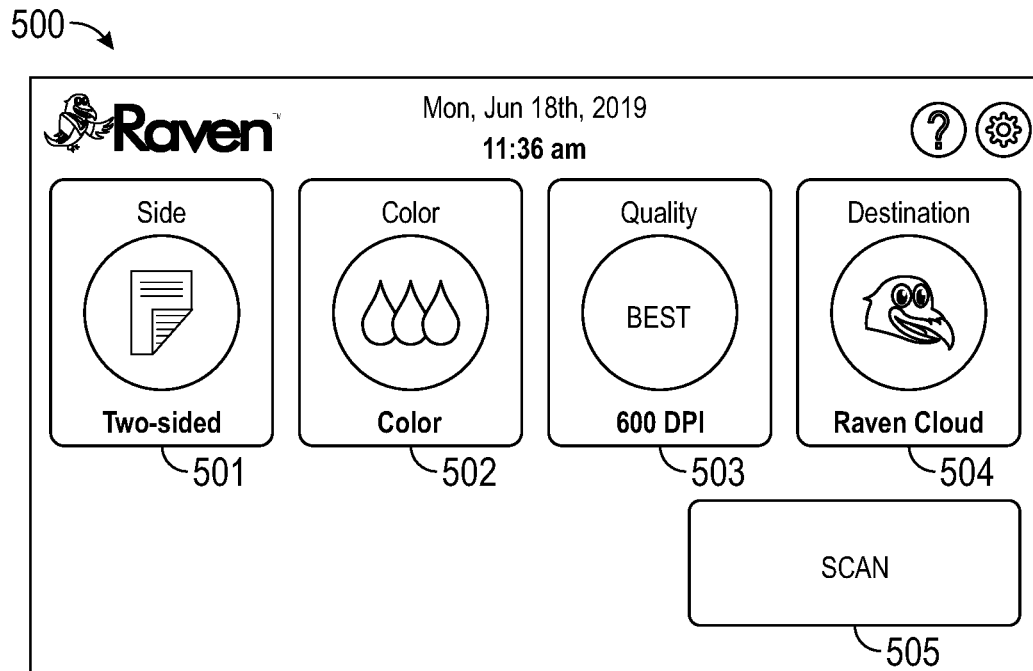
FIGS. 5-7 illustrate exemplary user interface displays in accordance with various embodiments.

Next, the user selects the desired scan settings (203), and selects the destination (204) to which the finished document is to be sent. In one embodiment, for example, the user is prompted (via touch screen 112) to select: (1) number of sides (1-sided/2-sided), (2) color (full color, black and white, or greyscale), (3) quality (200 dpi, 400 dpi, 600 dpi), and (4) destination (e-mail, Raven Cloud, Google Drive, Dropbox, USB, etc.). With momentary reference to FIG. 5, one particularly intuitive user interface configuration that may be employed for this selection includes a display 500 including four large buttons: 501 (for "sides"), 502 (for "color"), 503 (for "quality"), and 504 (for "destination", or "action"). Display 500 further includes a "scan" button 505 that can be used to initiate the scanning process, corresponding to step 205 in FIG. 2.

When the user initiates a scan (205), the scanner app requests, for example using a middleware plug-in prompted by the scanner app, that the scanner hardware actually perform the page scanning operation and conduct initial processing of the resulting image (206). The plug-in then informs the scanner that the scanned pages are stored locally in a designated folder. Subsequently, at 207, thumbnail images of the scanned page or pages are generated by scanner 110 for display on touch screen 112.

Continuing with step 208, the user is provided the opportunity to scan additional pages. If the user chooses to do so, then processing loops back to step 205; if not, then processing continues at step 209, wherein the user is presented with a user interface that allows the user to remove pages, reorder pages, edit pages, and/or combine pages within a single document. The user may also rotate, crop, or pan individual pages.

Figure 6:
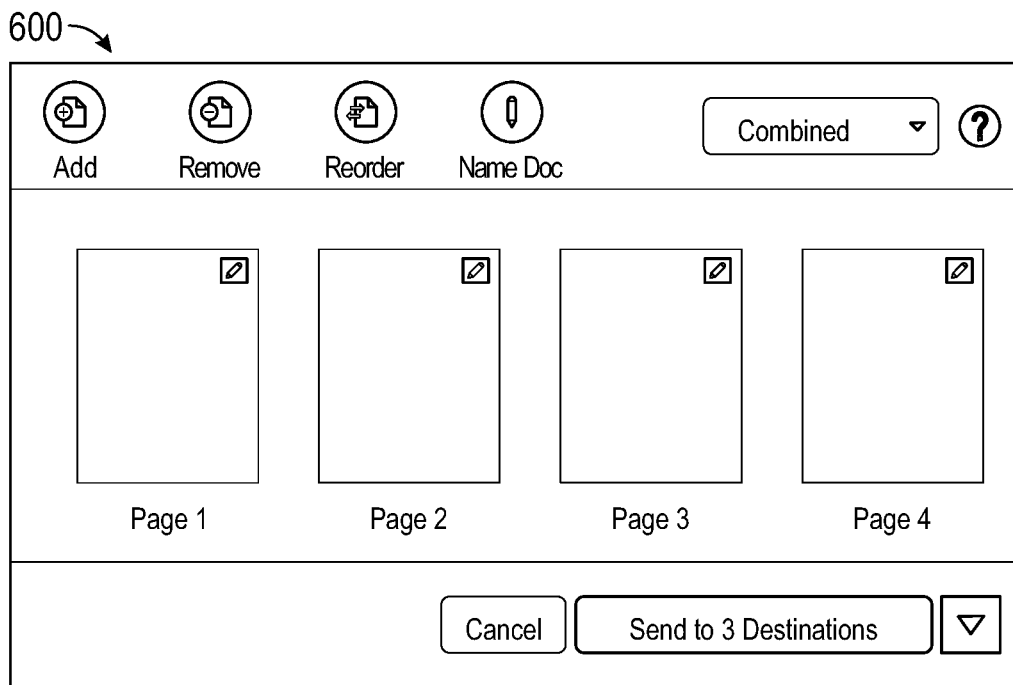
Figure 7:
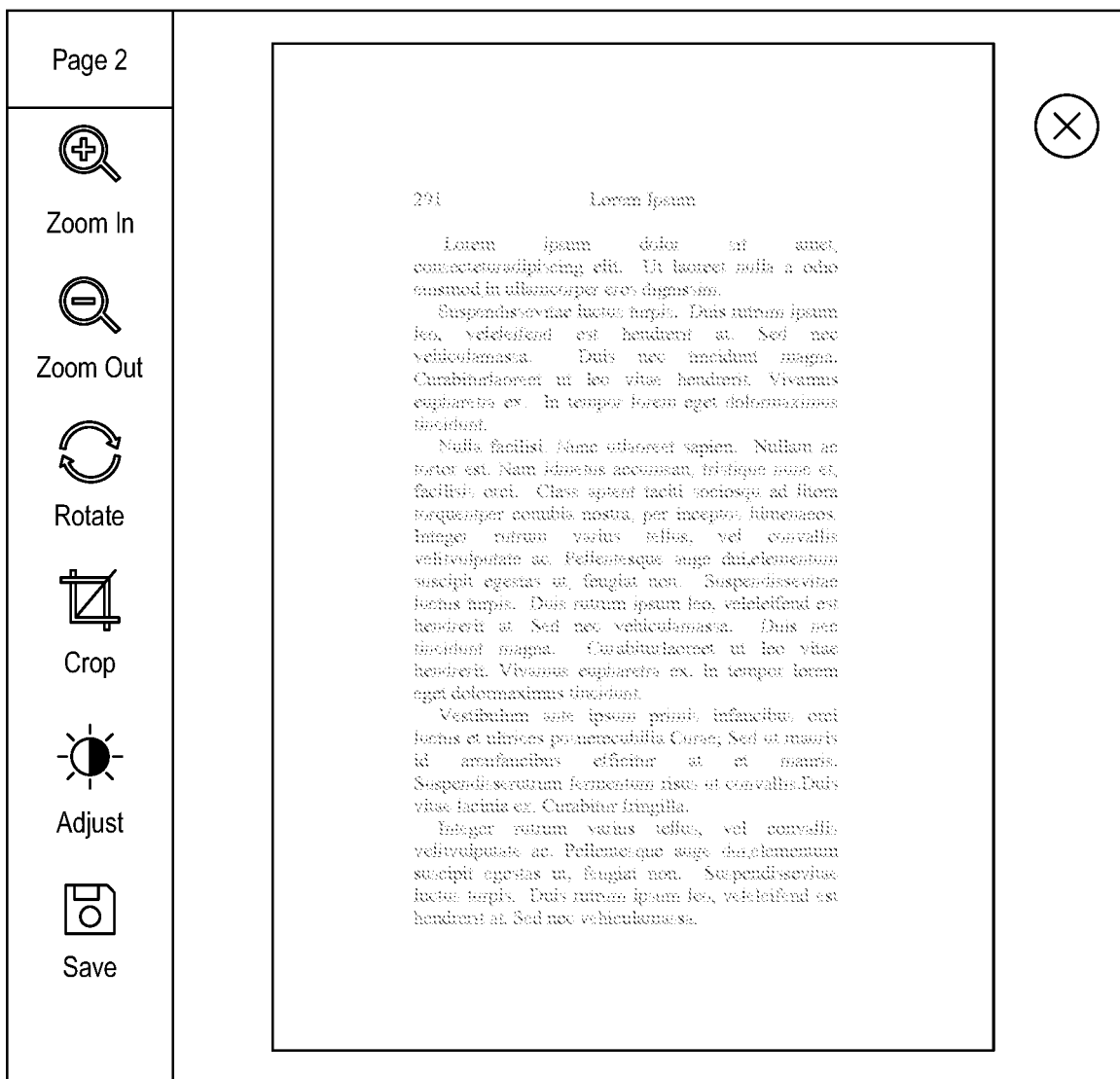

For example, referring briefly to FIG. 6, the user may be presented with a series of thumbnail images along with touch screen user interface 600 components that allow the user to combine, remove, and reorder individual pages. Similarly, as shown in FIG. 7, the user may be provided with user interface components (700) for rotating, cropping, and zooming in on a page alongside a relatively large thumbnail of the page being modified.

Referring again to FIG. 2, when the desired page operations have been completed, the user is provided the opportunity to name the document (210) and to change the destination (211). Subsequently, the document is transmitted (212) to the desired destination as described in further detail below.

Figure 3:
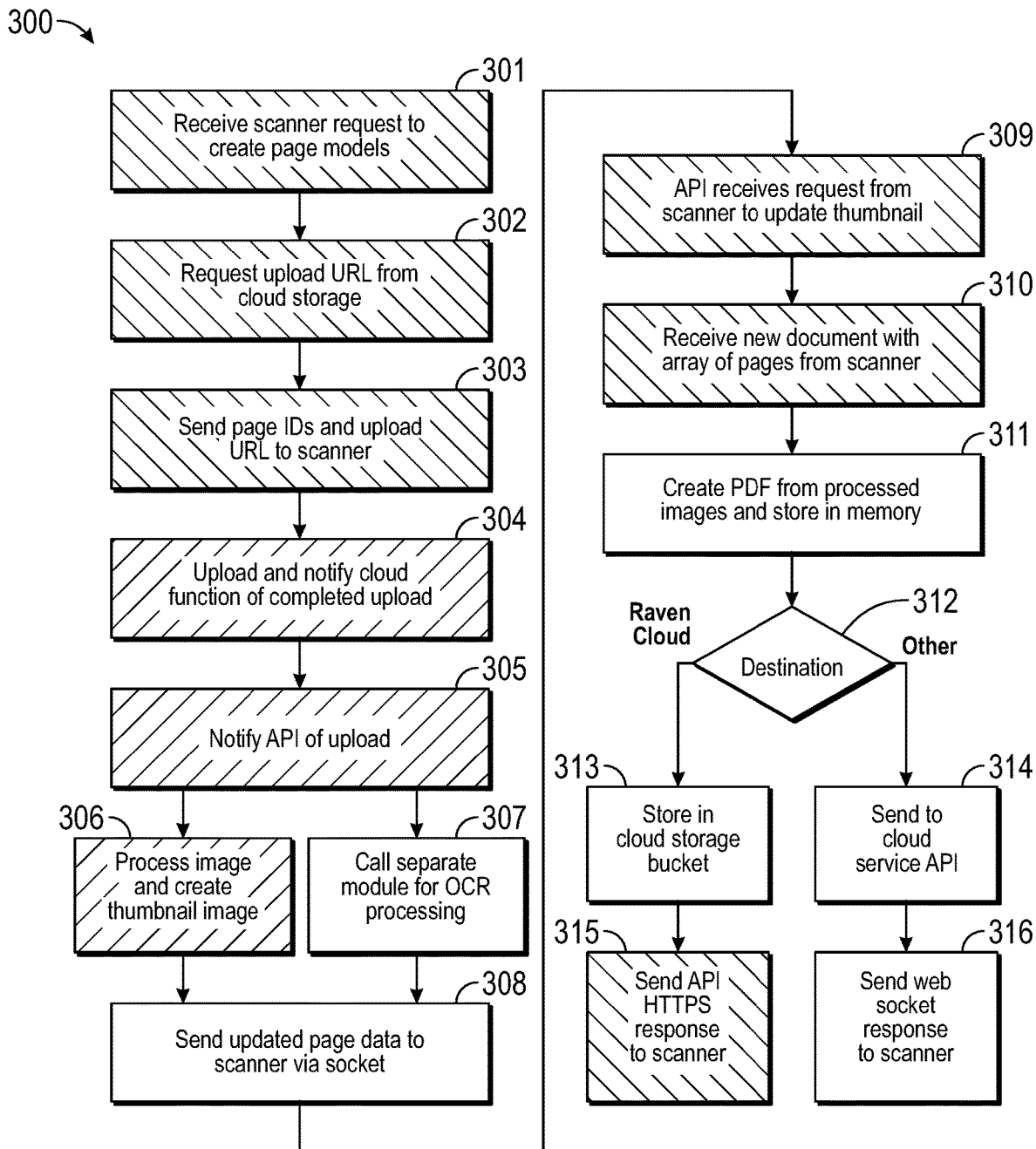
FIG. 3 is a flowchart illustrating exemplary interaction between a scanner API and a remote computing platform in accordance with various embodiments.

FIG. 3 illustrates a scanner application and associated plug-in flow 300 in accordance with one embodiment. In this illustration, as indicated by the key at the lower right, the shading used in each block is related to the entity that performs or is the focus of that step—i.e., the Raven API 141, serverless function module 143, and job processor 142.

At 301, Raven API 141 receives a request from scanner 110 to upload a page or group of pages (identified by filename) to cloud storage 145 and requests an upload URL (302). Raven API 141 then creates and returns, for each scanned page, a page model (including page ID) along with an upload URL to the scanner in response to the upload request (303). The page model contains the metadata stored in the cloud storage pertaining to a scanned file (e.g., filename, file type, time stamp, and a pointer or reference to the associated URL). Note that the scanner 110 typically only communicates with Raven API 141, whereas the API communicates with the various cloud based processing and storage modules as needed. Significantly, however, once Raven API 141 passes the URLs to scanner 110, the scanner is able to upload the image files directly to cloud storage 145 (bypassing Raven API 141).

Having received the upload URL, the scanner 110 then begins uploading respective images to the API (304), which directs them to the appropriate location (URL) in cloud storage 145. Serverless function 143 is notified that upload has completed, and Raven API 141 is also notified (305).

While not illustrated in FIG. 3, the user is then provided an opportunity to combine and edit the individual pages, as described above in FIG. 2. For each selected editing function performed by the user, the scanner sends the editing instructions and associated image coordinates to the API, whereupon the API retrieves the image data from Google Cloud storage and processes the requested changes (e.g., cropping). The API then stores the processed image at a new assigned location (URL) in the cloud, and also returns the revised images to the scanner to be displayed as edited thumbnails. If additional pages are added to the data set, the user is given the opportunity to edit the new pages. All versions of all images are persisted in respective uniquely assigned URLs. This allows the user to quickly "undo" an edit or instantly go back and view a previous version of any image.

Subsequently, at 306, serverless function module 143 processes each image and creates a corresponding thumbnail image. In a parallel operation (307), the API calls a separate module (e.g., an OCR module 147 in FIG. 1) to perform optical character recognition on the uploaded images. The extracted text data may be stored, for example, in accordance with the OCR data representation standard. Next, at 308, the updated page data is sent to scanner 110 via, for example, a websocket interface. The Raven API then receives a request from the scanner to update the thumbnails (309), and the new document with an array of pages are received from scanner 110 (310).

It should be noted that Raven API 141 outsources creation of the thumbnails by invoking serverless functions 143. Upon creating each thumbnail, serverless functions 143 writes it directly into cloud storage 145 and provides the location information to Raven API 141, which then updates the page model to include a path to the thumbnail. In this regard, the scanner 110 may be configured to communicate with Raven API 141 through a socket implementation; if the scanner does not receive a thumbnail URL (or other expected parameter) in a timely manner, the scanner may query Raven API 141 directly. Stated another way, the default paradigm is to push messages; the failsafe backup paradigm is to pull them.

The finished PDF is then created by job processor 142 (at 311) from the OCR data and the previously processed images and stored in cloud storage 145. That is, once the final data set is complete, the user instructs the scanner 110 and the scanner instructs the Raven API 141 to send the data set to the selected destination. In response, the API retrieves the then current version of each page, and invokes the application (within cloud platform 140) to perform the computationally intensive function of assembling them into a single PDF file.

The transient image data (e.g., the various edited versions) still stored in cloud storage 145 may then be deleted to conserve overhead. Once the final PDF document is created for a finished data set, the previously extracted OCR text (stored, for example, within database 148) is embedded into (or layered onto) the PDF file, for example by associating a metadata file containing the text with the PDF file. As a result, users can effectively "search" the PDF document by searching the text inside the metadata file.

Depending upon the destination (query at 312), the system either stores the PDF in a cloud storage bucket for Raven Cloud (313) and sends an HTTPS response to scanner 110 (315), or sends to the PDF to the appropriate cloud service API (314) and sends a websocket response to scanner 110 (316).

It will be appreciated that serverless function module 143 communicates with Raven API 141 in multiple instances. For example, when each image is initially uploaded, serverless function module 143 notifies the Raven API 141, automatically creates a thumbnail, and provides the thumbnail URL to the Raven API 141. Also in response to an image upload, the Raven API 141 instructs the OCR module 147 (e.g., Google Cloud Vision or a third party processor) to commence OCR processing on the uploaded image. OCR module 147 retrieves the image from cloud storage 145, extracts the textual elements from the image, and returns the text to the API which updates the page model accordingly. If the user further edits the document or individual pages, the OCR function 147 is again performed for each revised image as necessary.

Figure 4A:
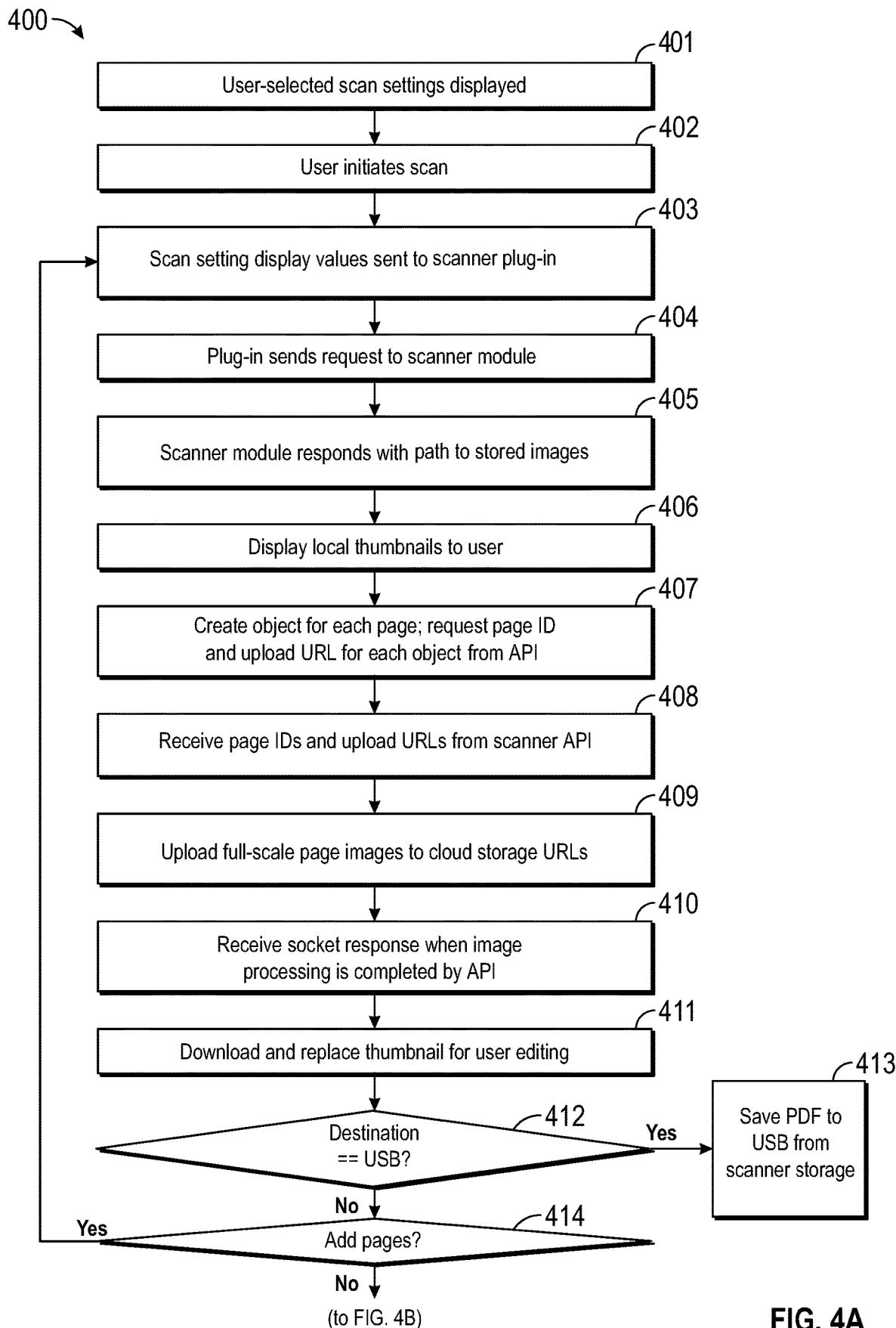
FIGS. 4A-4B are flowcharts illustrating exemplary interaction among a scanner application and remote processing and storage components in accordance with various embodiments.
Figure 4B:
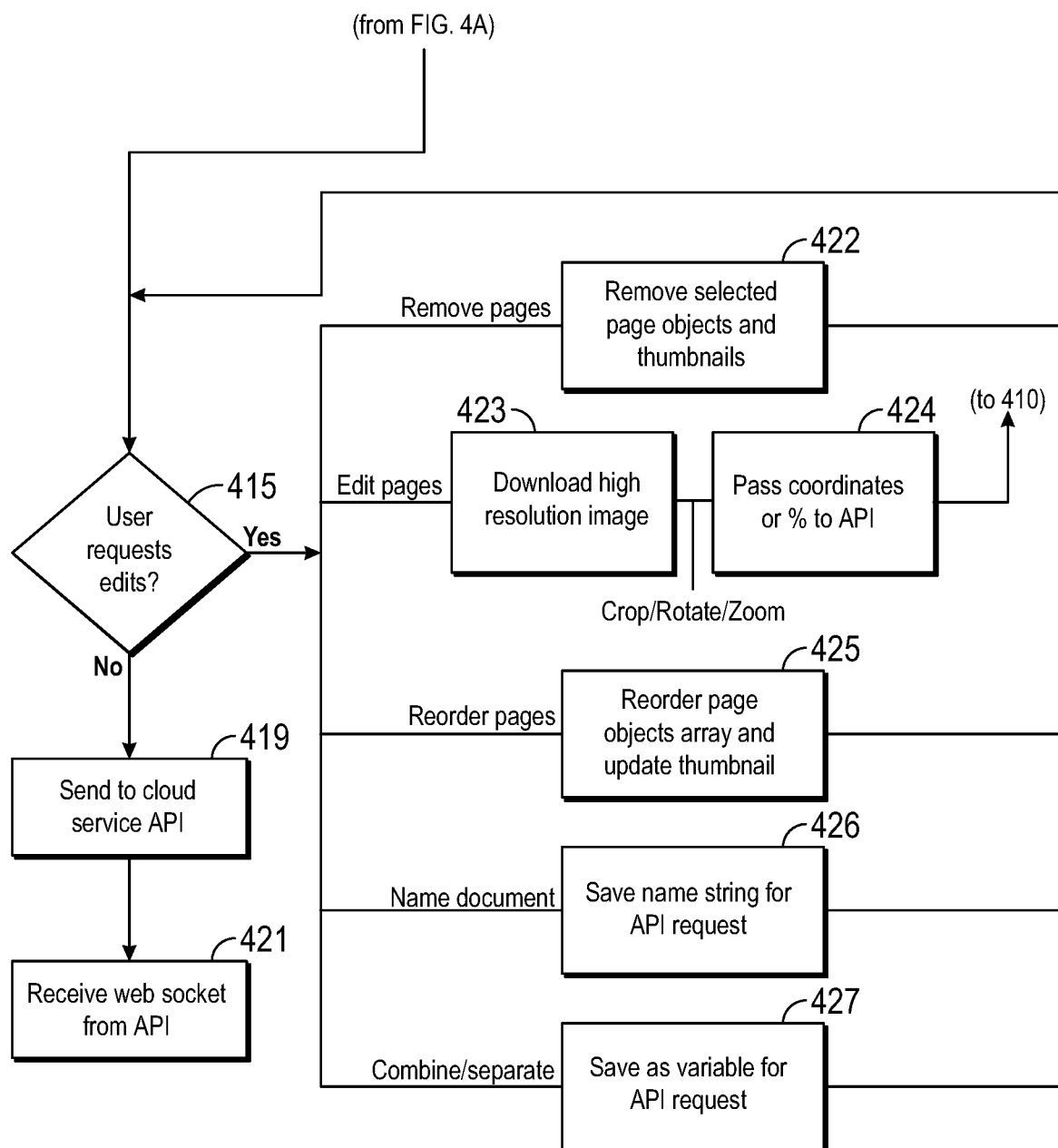

FIGS. 4A and 4B together provide a flowchart that includes and further elaborates on the procedures described in FIGS. 2 and 3. Referring first to FIG. 4A, method 400, as described in general above, begins with the user-selected scans being displayed (401). When the user initiates a scan (402), the scan setting values are sent to a scanner plug-in (403), which sends an appropriate request to the scanner module (404), which then in turn responds with paths to the locally stored images (405). A set of local thumbnail images are then displayed to the user based on the scanned pages (406).

The scanner 110 creates an object (e.g., allocates space) for each page and requests a page ID and upload URL for each object from Raven API 141 (407). Upon receiving the page IDs and upload URLs from scanner Raven API 141 (408), the full-scale page images are uploaded to cloud storage and directed to the assigned URLs (409).

When scanner 110 receives a socket response from Raven API 141 indicating that upload of the image files is complete (410), scanner 110 downloads (from specified URLs) the improved thumbnails generated by serverless functions 143 and uses them in place of the original thumbnails (411).

If the destination specified by the user corresponds to the USB drive (or similar flash memory component) (412), the scanner 110 simply requests that the cloud computing platform create the finished PDF document and then copies that file directly to the USB drive (413).

If the user indicates (e.g., through user interface 112) that she wishes to add pages (at 414), processing loops back to step 403. If no pages need to be added, processing continues with conditional 415 (FIG. 4B), which queries whether the user has completed page edits.

If the user requests edits (415), the edit commands are received by user interface 112 and performed (and the Raven API 141 is notified as appropriate) as shown in steps 422-427. That is, the user may remove pages (422), edit a page (423) (crop/rotate/zoom), reorder the pages (425), name or rename the document (426), and/or combine/separate the document (427). In the event that pages are cropped, rotated, or zoomed, the appropriate coordinates and/or edit instructions (e.g., percentage of reduction) are transmitted to Raven API 141 so that the changes can be implemented and subsequently reflected in the page model 182 (424), and processing loops back to step 410. When the document is named and/or its pages are combined or separated, the corresponding variables are stored for transmittal to Raven API 141.

If at step 415 it was determined that the user is done with page edits, the system initiates the sending of the final document to the appropriate cloud service API (419), and subsequently receives a corresponding web socket response from the API (421).

Figure 8A:
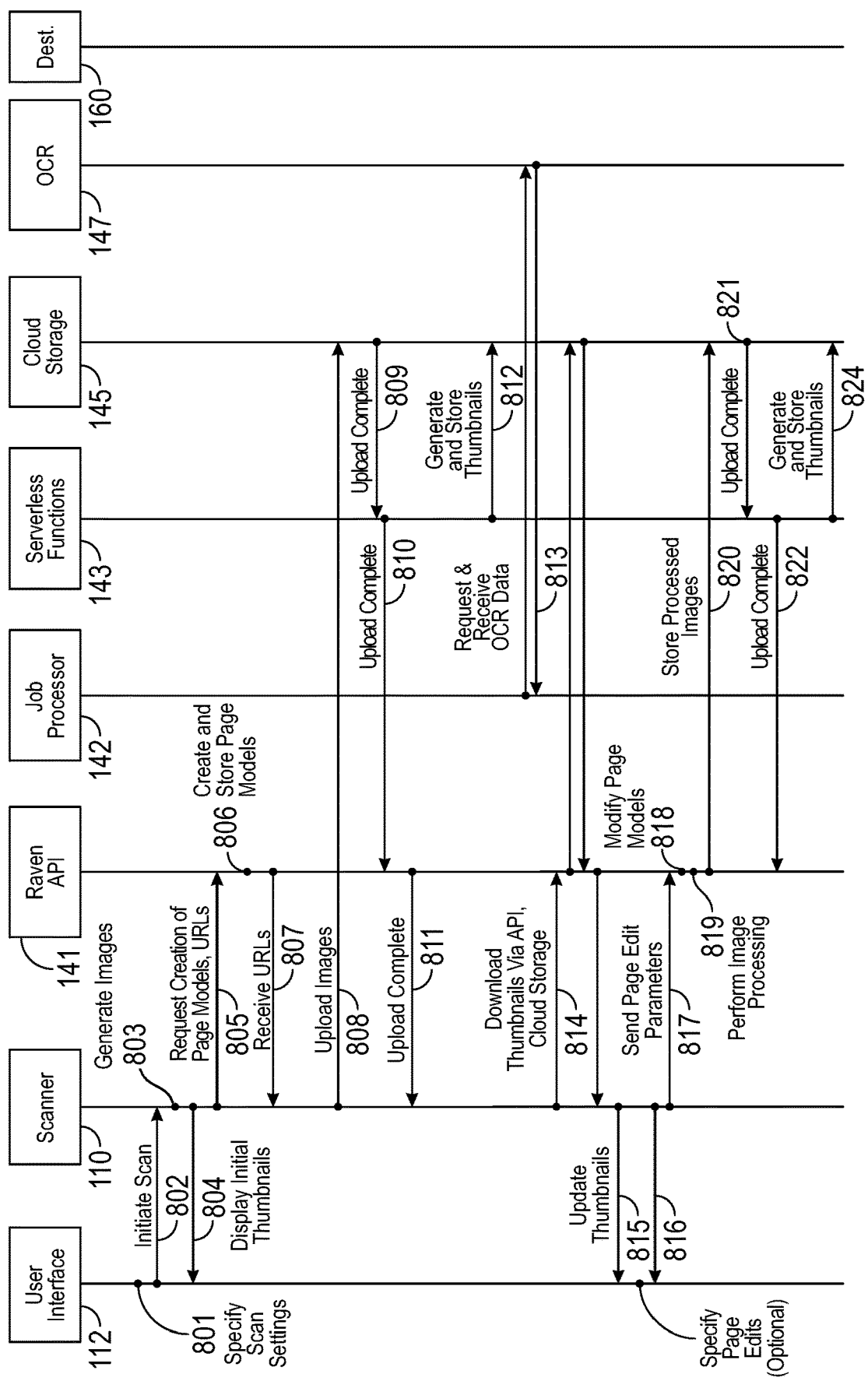
FIGS. 8A-8B depict a signal flow diagram illustrating exemplary methods for operating the system of FIG. 1 in accordance with various embodiments.
Figure 8B:
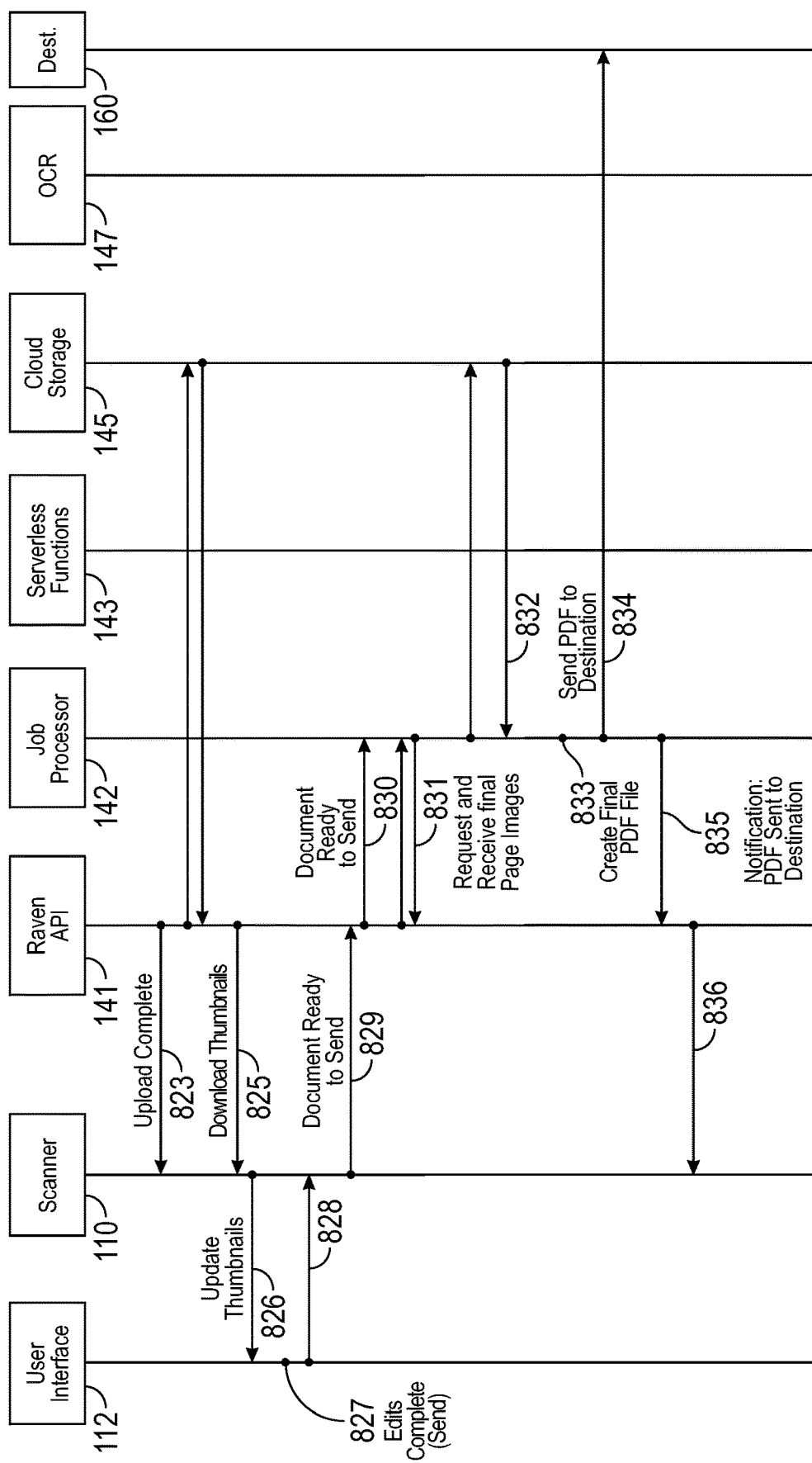

FIGS. 8A and 8B together present a signal diagram illustrating an exemplary method for operating the system of FIG. 1 in accordance with various embodiments. More particularly, this diagram contemplates interaction between eight entities: the scanner's user interface 112, the scanner 110, the Raven API 141, the job processor 142, the serverless functions module 143, cloud storage 145, OCR module 147, and the final destination 160.

Processing begins at 801, in which the user (via user interface 112) specifies the desired scan settings, and scanner 110 is sent a request to initiate a scan (802). Scanner 110 generates a set of images corresponding to the scanned document (803) and then displays the initial thumbnails based on those images via user interface 112 (804).

Next, scanner 110 requests that Raven API 141 create the appropriate page models (805), which are then created and stored by Raven API 141 (806). Scanner 110 also requests and receives specific storage URLs from Raven API 141 corresponding to the scanned images (807). Scanner then directly uploads the images to cloud storage 145 based on those URLs (808). Once upload is complete, an associated event (809) is received by serverless functions 143, which then notifies Raven API 141 of the completed upload (810), which in turn notifies scanner 110 (811).

Serverless functions module 143 generates and stores a set of thumbnails in cloud storage 145 (812), and job processor 142 requests and receives OCR data from OCR module (e.g., Google Cloud Vision) 147 (813). The OCR data may be stored in a variety of locations, but in one embodiment is stored within the pages model itself by Raven API 141.

Scanner 110 then downloads the created thumbnails from cloud storage 145 via Raven API 141 using the communication path shown (814). The updated thumbnails are then displayed via user interface 112 (replacing the initially displayed set of thumbnails) (815).

Next, the user may be allowed to specify page edits, as detailed above. If the user selects any such page edits, then scanner 816 is notified, which in turn sends the appropriate set of page edit parameters to Raven API 141 (817), which modifies the associated page models (818) and perform the required image processing to accomplish the page edits requested by the user (819).

The processed images are then stored in cloud storage 145 (820), which then notifies scanner 110 that upload has completed via serverless function module 143 and Raven API 141 (signal flow 821, 822, and 823).

Serverless function module 143 then automatically creates new thumbnails for each of the revised pages (824). Those thumbnails are then downloaded by scanner 110 via Raven API 141 (825) and displayed on user interface 112 (826).

Referring now to FIG. 8B, editing continues as necessary until no more edits are required, and the user indicates, via user interface 112, that the document is ready to be completed and sent to the destination (827). A request is sent to scanner 110 (828), which then notifies Raven API 141 (829), which in turn notifies job processor 142 (830).

Job processor 142 requests and receives page models and OCR data from Raven API 141 (831), then requests and receives final page images from cloud storage 145 (832). This information is then used by job processor 142 to generate a final, searchable PDF file (833). Job processor 142 then sends the finished PDF file to destination 160 (834) and notifies scanner 110 through Raven API 141 (835 and 836), using a method that depends upon the nature of final destination 160, as described in greater detail above.

In summary, what has been described are improved, easy-to-use, cloud-based systems and methods for scanning, securely storing, managing, and retrieving digital documents.

In accordance with one embodiment, the document scanning system comprises: a cloud computing platform including a cloud computing application and a cloud storage system; a scanning device communicatively coupled over a network to the cloud computing platform, the scanning device configured to: accept a set of documents; generate a set of digital image files corresponding to the set of documents; store the set of digital image files; and upload the set of digital image files directly to the cloud storage system. Upon receiving a request from the scanning device, the cloud computing application is configured to: access the set of digital image files; apply image processing operations to the set of digital image files in accordance with a plurality of image processing parameters; generate a portable document format document based on the processed image files; and send the portable document format document to a user-selected destination.

In accordance with another embodiment, a document scanning system includes: a cloud computing platform including a cloud application programming interface (API) and a cloud storage system; a scanning device communicatively coupled over a network to the cloud computing platform, the scanning device configured to: accept a set of documents; generate a set of digital image files corresponding to the set of documents; store the set of digital image files; request, from the cloud API, a set of uniform resource locators (URLs) corresponding to the set of digital image files; receive a set of specified URLs from the cloud API; and upload the set of digital image files directly to the cloud storage system based on the set of specified URLs.

In accordance with another embodiment, a document scanning system comprises: a cloud computing platform including a cloud application programming interface (API) and a cloud storage system; a scanning device communicatively coupled over a network to the cloud computing platform, the scanning device configured to: accept a set of documents, generate a set of digital image files corresponding to the set of documents, store the set of digital image files; upload the set of digital image files directly to the cloud storage system; receive, via a user interface module integrated into the scanning device, a document editing command from a user, wherein the document editing command is selected by the user from a list of commands including: page crop, page rotation, page zoom, remove pages, combine pages, and reorder pages; and send, to the cloud API, a request to edit the digital image files in accordance with the document editing command.

In accordance with another embodiment, a document scanning system comprises: a cloud computing platform, a scanning device communicatively coupled over a network to the cloud computing platform, the scanning device configured to: accept a set of documents, generate a set of digital image files corresponding to the set of documents, store the set of digital image files, and upload the set of digital image files directly to the cloud storage system. Upon completion of the upload of the set of digital image files, the cloud computing platform automatically generates a thumbnail preview of each of the digital image files and sends the thumbnail previews to the scanning device. The document scanning system may be further configured to, upon completion of the upload of the set of digital image files, generate a request to perform optical character recognition on each of the digital image files.

A document scanning device in accordance with another embodiment includes: a processing module; an image sensor module communicatively coupled to the processing module, and an automated document feeder communicatively coupled to the processing module. The image sensor module is configured to: accept a set of documents via the automated document feeder; determine, for each document within the set of documents: a duplex/simplex attribute for each document, generate a set of digital image files corresponding to the set of documents and the duplex/simplex determinations, store the set of digital image files, and upload the set of digital image files directly to a cloud storage system communicatively coupled to the processing module over a network.

Scanner Device with Remote Image Processing

A document scanner includes: a scanner housing; an automatic document feeder (ADF) configured to scan printed pages; a touch screen configured to: i) receive user input including a scan request and an edit request and ii) display respective thumbnail representations of a scanned page and an edited version of the scanned page; a network interface; and a processing module disposed within the housing and configured to execute a scanner application to thereby control selected functions of the ADF, the network interface, and the touch screen. In response to a scan request, the scanner application causes the ADF to create a digital image of a printed page and to upload, using the network interface, the digital image to a remote image processing platform. In response to an edit request, the scanner application transmits an associated edit instruction, using the network interface, to the remote image processing platform to process the edit instruction.

In an embodiment, upon processing of the edit instruction by the remote image processing platform, the scanner receives the edited version of the scanned page and displays the corresponding thumbnail image.

In response to the edit request, image processing of the uploaded version of the printed page is performed by an image processor located outside of the housing.

In an embodiment, the user input further comprises a desired destination and a send request. In response to a send request, the scanner application transmits an associated send instruction, using the network interface, to the remote image processing platform to process the send instruction; and the remote image processing platform transmits a finished document to the desired destination.

In an embodiment, the desired destination comprises at least one of: a local universal serial bus (USB) device; an email server; and a cloud storage location.

In an embodiment, the scanner also includes a rechargeable battery pack configured to power the scanner in addition to or in lieu of an AC power source.

In an embodiment, the network interface comprises at least one of a wired connection and a wireless connection.

In an embodiment, the processing module is further configured to execute a middleware layer including a plurality of plug-ins that communicate instructions from the scanner application to the ADF, the touch screen, and the network interface.

In an embodiment, after the digital image is uploaded to the remote image processing platform, the scanner receives a second thumbnail image corresponding to the uploaded image and displays the second thumbnail image on the touch screen.

In an embodiment, the remote image processing platform comprises an application programming interface (API) and a cloud computing platform; and in response to a scan request, the scanner application sends an upload request to the API.

In response to sending the upload request to the API, the scanner application receives a URL and uploads the digital image to the cloud computing platform.

In an embodiment, uploading the digital image to the cloud computing platform comprises bypassing the API and uploading the image directly to the cloud computing platform.

In an embodiment, the cloud computing platform comprises a storage component and a processing component; and uploading the digital image comprises uploading the digital image to storage component.

In an embodiment, transmitting the edit instruction to the remote image processing platform comprises: transmitting the edit instruction from the scanner to the API; and causing the API to coordinate processing of the edit instruction.

In an embodiment, uploading the digital image comprises uploading the digital image directly to the storage component.

In an embodiment, uploading the digital image comprises instructing the API to create a page model corresponding to the digital image and storing the page model in the storage component.

A scanning device is provided which includes: a user interface configured to receive an edit request from a user; a network interface, and a processor configured to execute a scanner application. In response to the edit request, the processor transmits an edit instruction, using the network interface, to a remote image processing platform to process the edit instruction.

In an embodiment, the remote image processing platform comprises an application programming interface (API) and a computing platform; and transmitting the edit instruction comprises transmitting the edit instruction from the processor to the API.

In an embodiment, transmitting the edit instruction further comprises invoking, by the API, an image processing executable module.

In an embodiment, after the edit instruction is processed, the scanner receives a thumbnail from the remote image processing platform corresponding to an edited image.

Scanner Methods for Remote Image Processing

An image processing method performed by a document scanner includes: receiving a scan request; in response to the scan request, creating a digital image of a printed page, uploading the digital image to a remote image processing platform, receiving a request to edit the digital image, and in response to the edit request, transmitting an associated edit instruction to the remote image processing platform to process the edit instruction.

In an embodiment, at least one of the scan and edit requests are received from a user.

In an embodiment, at least one of the scan and edit requests are received by a user interface.

In an embodiment, the user interface comprises a touch panel.

In an embodiment, the method further includes the steps of: after uploading the digital image, receiving a first thumbnail representative of the digital image from the remote image processing platform, and after transmitting the edit instruction, receiving a second thumbnail representative of the edited digital image from the remote image processing platform.

In an embodiment, the method further includes the steps of: after receiving the first thumbnail, displaying the first thumbnail on a display screen, and after receiving the second thumbnail, replacing the first thumbnail with the second thumbnail on the display screen.

In an embodiment, uploading the digital image comprises: sending an upload request from the scanner to the remote image processing platform, receiving, from the remote image processing platform, a URL, and transmitting the digital image and the URL from the scanner to the remote image processing platform.

In an embodiment, the remote image processing platform comprises an API and a cloud computing platform; receiving the URL comprises receiving the URL from the API; and transmitting the digital image comprises transmitting the digital image directly from the scanner to the remote image processing platform.

In an embodiment, the cloud computing platform comprises a computing component and a cloud storage component; and transmitting the digital image comprises transmitting the digital image to the URL within the cloud storage component.

In an embodiment, transmitting the edit instruction comprises transmitting the edit instruction to the API.

In an embodiment, the method further includes: receiving a send request; and in response to the send request, instructing the remote image processing platform to transmit a PDF embodying a version of the digital image to a predetermined destination.

In an embodiment, the destination comprises one of a USB drive, an email address, and a cloud storage address.

API "Structure" Embodiments

An application programming interface (API) is configured to coordinate interaction between a scanner and a cloud computing platform, where the cloud computing platform is disposed remotely from the scanner. The API includes a set of instructions which, when executed by a processor: receive, in response to an upload request from the scanner, a URL from the cloud computing platform and transmit the URL to the scanner; and in response to an edit request from the scanner, transmit an editing instruction to the cloud computing platform and thereafter transmit an edited image to the scanner.

In an embodiment, the API is further configured to: in response to a send request from the scanner, instruct the cloud computing platform to transmit a PDF of a scanned image to a user selected destination.

In an embodiment, the destination comprises at least one of a USB drive, an email server, and a cloud storage location.

In an embodiment, the editing instruction invokes an image processing routine, wherein the routine is not executed by the scanner.

API Methods

A scanning protocol is implemented by an API, where the API is associated with a scanner and a remote computing platform. The protocol includes the steps of: receiving a document upload request from the scanner; in response to receiving the upload request, requesting and receiving a first URL from the cloud computing platform; and transmitting the first URL to the scanner.

The scanning protocol further includes transmitting a first thumbnail of an uploaded image to the scanner.

In an embodiment, the scanning protocol further includes receiving an edit instruction and the first URL from the scanner and, in response to receiving the edit instruction: retrieving the uploaded image from the first URL, coordinating the execution of the edit instruction on the uploaded image to yield an edited image, requesting a second URL from the cloud computing platform for the edited image, and transmitting the second URL to the scanner.

In an embodiment, the scanning protocol further includes coordinating the creation of a second thumbnail for the edited image; and transmitting the second thumbnail to the scanner.

In an embodiment, the edit instruction is executed remotely from the scanner.

Scanning Systems with Cloud Processing

A document scanning system includes a cloud computing platform including a cloud computing application and a cloud storage system, and a scanning device communicatively coupled over a network to the cloud computing platform. The scanning device is configured to: accept a set of documents, generate a set of digital image files corresponding to the set of documents, store the set of digital image files, and upload the set of digital image files directly to the cloud storage system. Upon receiving an upload request from the scanning device, the cloud computing application is configured to: receive the set of digital image files from the scanning device, apply image processing operations to the set of digital image files, generate a portable document format document based on the processed image files, and send the portable document format document to a user-selected destination.

In an embodiment, the image processing operations are performed in accordance with a plurality of user selected image processing parameters.

In an embodiment, the scanner is further configured to upload the set of digital image files to specific URLs within the cloud storage system previously received by the scanner from the API.

In an embodiment, the image processing operations are applied to the set of digital image files remote from the scanner.

Scanners and URL Requests

A document scanner is configured to communicate over a network with a cloud computing platform including a cloud application programming interface (API) and a cloud storage system. The scanner is configured to: accept a set of documents, generate a set of digital image files corresponding to the set of documents, store the set of digital image files, request, from the cloud API, a set of uniform resource locators (URLs) corresponding to the set of digital image files; receive a set of specified URLs from the cloud API, and upload the set of digital image files directly to the cloud storage system based on the set of specified URLs.

In an embodiment, the scanner is further configured to: receive an edit command from a user for a first one of the digital image files, transmit indicia of the edit command to the cloud API, and thereafter receive, from the API, a version of the first digital image files edited in accordance with the edit command.

Scanning Systems with Edit Requests Input at the Scanner

A document scanning system includes: a cloud computing platform including a cloud application programming interface (API) and a cloud storage system; and a scanning device communicatively coupled over a network to the cloud computing platform. The scanning device is configured to: accept a set of documents; generate a set of digital image files corresponding to the set of documents; store the set of digital image files; upload the set of digital image files directly to the cloud storage system; receive, via a user interface module integrated into the scanning device, a document editing command from a user, wherein the document editing command is selected by the user from a list of commands including: page crop, page rotation, page zoom, remove pages, combine pages, and reorder pages; and send, to the cloud API, a request to edit the digital image files in accordance with the document editing command.

Scanner System with Remote Thumbnail/OCR Generation

A document scanning system includes a cloud computing platform and a scanning device communicatively coupled over a network to the cloud computing platform. The scanning device is configured to: accept a set of document, generate a set of digital image files corresponding to the set of documents, store the set of digital image files, and upload the set of digital image files directly to the cloud storage system. Upon completion of the upload of the set of digital image files, the cloud computing platform automatically generates a thumbnail preview of each of the digital image files and sends the thumbnail previews to the scanning device.

In an embodiment, the cloud computing platform is further configured to, upon completion of the upload of the set of digital image files; generate a request to perform optical character recognition on each of the digital image files.

Scanners with Automatic Simplex/Duplex Detection

A document scanning device includes: a processing module, an image sensor module communicatively coupled to the processing module, and an automated document feeder communicatively coupled to the processing module. In an embodiment, the image sensor module is configured to: accept a set of documents via the automated document feeder; determine, for each document within the set of documents, a duplex/simplex attribute for each document; generate a set of digital image files corresponding to the set of documents and the duplex/simplex determinations; store the set of digital image files; and upload the set of digital image files directly to a cloud storage system communicatively coupled to the processing module over a network.

It will be appreciated that the embodiments described above are not intended to be limiting in any way, and that scanner 110 and/or scanning system 100 may incorporate additional advantageous features.

In accordance with one embodiment, for example, the image sensor module within module 170 is configured to accept a set of documents via the automated document feeder; determine, for each document within the set of documents, a duplex/simplex attribute for each document (i.e., whether it is one-sided or two-sided, and which side contains printed matter), generate a set of digital image files corresponding to the set of documents and the duplex/simplex determinations; store the set of digital image files; and upload the set of digital image files directly to a cloud storage system communicatively coupled to the processing module over a network. The scanner may further be configured to detect blank pages and remove such pages prior to rendering the final scanned document.

In accordance with one embodiment, user interface 112 allows the user to pause and resume a scan in order to, for example, substitute or add pages during the scanning operation itself.

In accordance with one embodiment, the set of URLs corresponding to the individual pages stored within cloud storage 145 can be provided to third-party systems for processing, such as an accounting system that might need such images for documentation purposes (e.g., Quickbooks or the like).

In accordance with one embodiment, user interface 112 allows the user to encrypt or otherwise add security features to the final document generated by the system. For example, the user may be allowed to enter a password which is then used by job processor 142 to generate a password-protected PDF file.

In accordance with one embodiment, user interface 112 allows the user to create and manage custom groups of destinations (e.g., e-mail recipients) for scanned documents.

In accordance with one embodiment, the final PDF file is rendered in physical, printed form and shipped to a specified physical address specified through user interface 112 itself.

In accordance with one embodiment, processing module 170 of scanner 110 includes cellular communication functionality so that, for example, it can transmit documents to destinations of the type often used in connection with cellular phones and the like.

In accordance with one embodiment, scanner 110, through network interfaces 175, may be entirely or partially controlled remotely by a user—e.g., through a website, mobile application, etc.

In accordance with one embodiment, the text generated by the OCR system 147 is "auto-masked" or otherwise automatically redacted prior to final document generation based on a determination of whether such text is sensitive in some way. Such redactions might be applied, for example, to social security numbers, credit card information, and sensitive health-related information.

In accordance with one embodiment, scanner 110 is configured to provide a custom watermark that can be selectably applied by the user through user interface 112. The final digital document is then rendered with that custom watermark by job processor 142.

In accordance with one embodiment, in the event that scanner 110 is not connected to network 150 when a user scans a document, the various uploading, image processing, downloading, and document generation steps described herein are suspended (and the images stored locally within scanner 110) until such time that a connection to network 150 is made.

In accordance with one embodiment, scanning system 100 is configured to produce editable documents (e.g., MS Word, MS PowerPoint, MS Excel, editable PDFs) in addition to read-only documents.

In accordance with one embodiment, in the event that the final digitized document is larger than some predetermined threshold (e.g., a threshold provided by the user via user interface 112), the system may provide the recipient with a secure download link rather than the file itself.

A document scanner is provided which includes: a scanner housing; an automatic document feeder (ADF) configured to scan printed pages, a touch screen configured to: i) receive user input including a scan request and an edit request, and ii) display respective thumbnail representations of a scanned page and an edited version of the scanned page; a network interface; and a processing module disposed within the housing and configured to execute a scanner application to thereby control selected functions of the ADF, the network interface, and the touch screen. In an embodiment: in response to a scan request, the scanner application causes the ADF to create a digital image of a printed page and to upload, using the network interface, the digital image to a remote image processing platform; and in response to an edit request, the scanner application transmits an associated edit instruction, using the network interface, to the remote image processing platform to process the edit instruction.

In an embodiment, upon processing of the edit instruction by the remote image processing platform, the scanner receives the edited version of the scanned page and displays the corresponding thumbnail image.

In an embodiment, in response to the edit request, the scanner application causes, using the network interface, an image processor located outside of the housing to process the edit instruction on the uploaded version of the printed page.

In an embodiment, the user input further comprises a desired destination and a send request; and in response to a send request, the scanner application instructs, using the network interface, the remote image processing platform to transmit a finished document to the desired destination.

In an embodiment, the desired destination comprises at least one of: a local universal serial bus (USB) device; an email server; and a cloud storage location.

In an embodiment, the scanner further includes a rechargeable battery pack configured to power the scanner in addition to or in lieu of an AC power source.

In an embodiment, the network interface comprises at least one of a wired connection and a wireless connection.

In an embodiment, the processing module is further configured to execute a middleware layer including a plurality of plug-ins that communicate instructions from the scanner application to the ADF, the touch screen, and the network interface.

In an embodiment, after the digital image is uploaded to the remote image processing platform, the scanner receives a second thumbnail image corresponding to the uploaded image and displays the second thumbnail image on the touch screen.

In an embodiment, the remote image processing platform comprises an application programming interface (API) and a cloud computing platform; and in response to a scan request, the scanner application sends an upload request to the API.

In an embodiment, in response to sending the upload request to the API, the scanner application receives a URL and uploads the digital image to the cloud computing platform.

In an embodiment, uploading the digital image to the cloud computing platform comprises bypassing the API and uploading the image directly to the cloud computing platform.

In an embodiment, the cloud computing platform comprises a storage component and a processing component; and uploading the digital image comprises uploading the digital image to storage component.

In an embodiment, transmitting the edit instruction to the remote image processing platform comprises: transmitting the edit instruction from the scanner to the API; and instructing the API to coordinate processing of the edit instruction.

In an embodiment, uploading the digital image comprises uploading the digital image directly to the storage component.

In an embodiment, uploading the digital image comprises instructing the API to create a page model corresponding to the digital image and storing the page model in the storage component.

A scanning device is also provided which includes: a user interface configured to receive an edit request from a user, a network interface, and a processor configured to execute a scanner application. In an embodiment, in response to the edit request, the processor transmits an edit instruction, using the network interface, to a remote image processing platform to process the edit instruction.

In an embodiment, the remote image processing platform comprises an application programming interface (API) and a computing platform, and transmitting the edit instruction comprises transmitting the edit instruction from the processor to the API.

In an embodiment, transmitting the edit instruction further comprises invoking, by the API, an image processing service.

In an embodiment, after the edit instruction is processed, the scanner receives a thumbnail from the remote image processing platform corresponding to the edited image.

An image processing method is performed by a document scanner. The method includes: receiving a scan request; in response to the scan request, creating a digital image of a printed page; uploading the digital image to a remote image processing platform; receiving a request to edit the digital image; and in response to the edit request, transmitting an associated edit instruction to the remote image processing platform to process the edit instruction on the digital image.

In an embodiment, at least one of the scan and edit requests are received from a user.

In an embodiment, at least one of the scan and edit requests are received by a user interface.

In an embodiment, the user interface comprises a touch panel.

In an embodiment, the method involves: after uploading the digital image, receiving a first thumbnail representative of the digital image from the remote image processing platform; and after transmitting the edit instruction, receiving a second thumbnail representative of the edited digital image from the remote image processing platform.

In an embodiment, the method involves: after receiving the first thumbnail, displaying the first thumbnail on a display screen; and after receiving the second thumbnail, replacing the first thumbnail with the second thumbnail on the display screen.

In an embodiment, uploading the digital image comprises: sending an upload request from the scanner to the remote image processing platform; receiving, from the remote image processing platform, a URL; and transmitting the digital image and the URL from the scanner to the remote image processing platform.

In an embodiment, the remote image processing platform comprises an API and a cloud computing platform; and the method further involves: receiving the URL comprises receiving the URL from the API; and transmitting the digital image comprises transmitting the digital image directly from the scanner to the remote image processing platform.

In an embodiment, the cloud computing platform comprises a computing component and a cloud storage component, and the method involves: transmitting the digital image comprises transmitting the digital image to the URL within the cloud storage component.

In an embodiment, transmitting the edit instruction comprises transmitting the edit instruction to the API.

In an embodiment, the method further involves: receiving a send request; and in response to the send request, instructing the remote image processing platform to transmit a PDF embodying a version of the digital image to a predetermined destination.

In an embodiment, the destination comprises one of a USB drive, an email address, and a cloud storage address.

In an embodiment, the user interface comprises a microphone.

In an embodiment, the user interface comprises a keypad.

In an embodiment, the method further involves transmitting the digital image to the remote image processing platform comprises bypassing the API.

In an embodiment, transmitting the digital image to the URL comprises bypassing the API.

In an embodiment, uploading comprises uploading over one of a wired and a wireless network connection.

In an embodiment, uploading the digital image comprises instructing the API to create a page model corresponding to the digital image and storing the page model in the storage component.

A method is also provided for operating a scanning device of the type including a user interface and a network interface. The method includes the steps of: receiving an edit request from a user at the user interface; and in response to receiving the edit request, transmitting an edit instruction, using the network interface, to a remote image processing platform to process the edit instruction.

In an embodiment, the remote image processing platform comprises an application programming interface (API); and transmitting the edit instruction comprises transmitting the edit instruction from the scanning device to the API.

An application programming interface (API) is provided. The API is configured to coordinate interaction between a scanner and a cloud computing platform disposed remotely from the scanner, and includes a set of instructions which, when executed by a processor, causes the API to: receive an upload request from the scanner; and in response to the upload request, request a URL from the cloud computing platform.

In an embodiment, the set of instructions further causes the API to: receive the URL from the cloud computing platform; and transmit the URL to the scanner.

In an embodiment, the set of instructions further causes the API to: after receiving the upload request, receive an instruction from the scanner to create a page model corresponding to an uploaded page.

In an embodiment, the set of instructions further causes the API to: create a page model; and store the page model in the cloud computing platform.

In an embodiment, the set of instructions further causes the API to: receive an edit request from the scanner; and in response to the edit request, transmit an editing instruction to the cloud computing platform.

In an embodiment, the set of instructions further causes the API to: coordinate processing of the edit request; and thereafter transmit an edited image to the scanner.

In an embodiment, the set of instructions further causes the API to: receive a send request from the scanner; and in response to the send request, instruct the cloud computing platform to transmit a PDF to a user selected destination.

In an embodiment, the user selected destination comprises at least one of a USB drive, an email server, and a cloud storage location.

In an embodiment, receiving the upload request from the scanner comprises receiving the upload request from a wired network connection.

In an embodiment, receiving the upload request from the scanner comprises receiving the upload request from a wireless network connection.

In an embodiment, coordinating processing of the edit request comprises invoking an image processing routine, wherein the image processing routine is not executed by the scanner.

An application programming interface (API) operated by a processor associated with a cloud computing platform is provided. The API includes computer code which, when executed by the server, causes the API to: receive an upload request from a scanner corresponding to a scanned image; in response to the upload request, retrieve a URL from the cloud computing platform; and transmit the URL to the scanner.

In an embodiment, the computer code further causes the API to: create a page model including a page ID for the scanned image; and return the page ID to the scanner along with the URL.

In an embodiment, the page model comprises metadata associated with the scanned image.

In an embodiment, the metadata comprises file information and indicia of the URL associated with the scanned image.

In an embodiment, the file information comprises a filename, a file type, and a time stamp.

In an embodiment, the computer code further causes the API to: receive a request from the scanner to edit the scanned image; process the edit request; return an edited version of the scanned image to the scanner; and store the edited version of the scanned image in the cloud computing platform.

In an embodiment, the computer code further causes the API to: invoke an optical character recognition (OCR) function; extract text from the edited version of the scanned image; and store the extracted text in the page model.

In an embodiment, the API further includes a document database configured to store the extracted text in JSON format.

In an embodiment, the page model further comprises at least one of a zoom, crop, and rotate parameter associated with the edit request.

A method implemented by a computer program executed by a processor is provided, where the computer program is associated with a scanner and a remote computing platform. The method includes the steps of: receiving a first image upload request from the scanner; in response to receiving the first image upload request, requesting a first URL from the cloud computing platform; after requesting the first URL from the cloud computing platform, receiving the first URL from the cloud computing platform; and after receiving the first URL from the cloud computing platform, transmitting the first URL to the scanner.

In an embodiment, the method further includes the steps of: upon uploading the first image to the cloud computing platform, receiving a notification from the cloud computing platform that the first image has been uploaded; thereafter receiving a first thumbnail URL from the cloud computing platform corresponding to the first image; and transmitting the first thumbnail URL to the scanner.

In an embodiment, the method further includes the steps of: in response to each upload request, creating a respective page model for each uploaded image; associating a unique page ID with each page model; and transmitting to the scanner the page ID for each uploaded image.

In an embodiment, each page model comprises metadata associated with a corresponding uploaded image.

In an embodiment, metadata comprises file information and indicia of the URL associated with the uploaded image.

In an embodiment, the file information comprises a filename, a file type, and a time stamp.

In an embodiment, the method further includes the step of updating the page model to include indicia of the first thumbnail URL.

In an embodiment, the method further includes the steps of: after receiving the notification that the first image has been uploaded, invoking an optical character recognition (OCR) module to extract text from the uploaded image; and receiving a file containing the extracted text from the OCR module.

In an embodiment, the method further includes the step of updating the page model to include the extracted text.

In an embodiment, the method further includes the steps of receiving an edit instruction and the first URL from the scanner and, in response to receiving the edit instruction: retrieving the uploaded image from the cloud computing platform using the first URL; processing the edit instruction on the uploaded image to yield an edited image; requesting a second URL from the cloud computing platform for the edited image; and transmitting the second URL to the scanner.

In an embodiment, the method further includes the steps of: receiving a second thumbnail URL for the edited image from the cloud computing platform; instructing the cloud computing platform to store the edited image at the second thumbnail URL location; and transmitting the second thumbnail URL to the scanner.

In an embodiment, the method further includes the steps of: receiving a series of edit instructions from the scanner and for each edit instruction: retrieving the image to be edited from the cloud computing platform; processing the edit instruction on the retrieved image to yield an subsequently edited image; requesting a successive URLs from the cloud computing platform for each subsequently edited image; and transmitting each successive URL to the scanner.

In an embodiment, the method further includes the steps of, for each edit instruction: receiving successive thumbnail URLs from the cloud computing platform; instructing the cloud computing platform to store successive processed images at a respective successive thumbnail URL location; and transmitting each successive thumbnail URL to the scanner.

In an embodiment, the method further includes the step of, for each successive processed image, updating the page model to include a path to the corresponding successive thumbnail URL.

In an embodiment, the method further includes the steps of: receiving a send request from the scanner; and, in response to the send request, instructing the cloud computing platform to send a completed PDF to a user selected destination.

In an embodiment, the user selected destination comprises at least one of a USB drive, an email server, and a cloud storage location.

In an embodiment, the method further includes the step of conducting communication between the processor and the scanner over one of a wireless and a wired network connection.

A method implemented by a computer program executed by a processor associated with a cloud computing platform is also provided. The method includes: receiving a request from a scanner to upload a page image; in response to the upload request, retrieving a URL from the cloud computing platform; creating a page model including a page ID for the uploaded image; and transmitting the page ID and the URL to the scanner.

In an embodiment, the method further includes the steps of: receiving a request from the scanner to edit the uploaded image; processing the edit request; returning an edited version of the uploaded image to the scanner; and storing the edited version in the cloud computing platform.

In an embodiment, the method further includes the steps of: invoking an optical character recognition (OCR) function; extracting text from the edited version of the uploaded image; and writing the extracted text to a document database configured to store the extracted text in JSON format A document scanning system is provided which includes: a remote computing platform including a cloud computing application and a cloud storage system; and a scanner communicatively coupled over a network to the remote computing platform. The scanner is configured to: scan a set of documents; generate a set of digital image files corresponding to the set of documents; store the set of digital image files locally; and upload the set of digital image files directly to the cloud storage system. The system further includes an application programming interface (API) configured to coordinate interaction between the scanner and the remote computing platform wherein, upon receiving an upload request initiated by the scanner, the cloud computing application is configured to provide storage location information for the digital image files to the API.

In an embodiment, the image processing operations comprise user selected image processing parameters.

In an embodiment, the API is configured to retrieve a set of URLs from the remote computing platform and transmit the set of URLs to the scanner.

In an embodiment, the scanner is further configured to bypass the API and upload the set of digital image files directly to the cloud storage system.

In an embodiment, the scanner is configured to upload the set of digital image files to predetermined locations within the cloud storage system in accordance with the respective URLs.

In an embodiment, the scanner is configured to receive instructions to edit the digital image files from a user, and to thereafter transmit the editing instructions to the API.

In an embodiment, the API is configured to retrieve the digital image files from the portable document format documents and to apply image processing operations to the set of digital image files in accordance with the editing instructions.

In an embodiment, the API is configured to store the image processed digital image files in the cloud storage system.

In an embodiment, the API is configured to: create a respective page model for each digital image file; associate a unique page ID with each page model; and transmit a unique page ID to the scanner for each digital image file.

In an embodiment, the API is configured to iteratively populate each page model with corresponding metadata pertaining to the associated digital image file.

In an embodiment, the API is configured to invoke an optical character recognition (OCR) function to extract text from each image processed digital image file, and to store the extracted text in the page model associated with each digital image file.

In an embodiment, the API is configured to generate portable document format (PDF) documents corresponding to the processed image files when all editing requests have been executed.

In an embodiment, generating a PDF comprises layering extracted text onto an image processed image file in a manner which permits subsequent searching for text strings.

In an embodiment, the scanner is configured to receive a send request from a user, and to thereafter transmit the send request to the API.

In an embodiment, the API is configured to retrieve a PDF document from the cloud storage system in response to receiving the send request, and to coordinate sending the PDF document to a user-selected destination.

In an embodiment, the user selected destination comprises at least one of a USB drive, an email server, and a cloud storage location.

In an embodiment, the scanner is configured to communicate with the API over one of a wireless and a wired network connection.

A remote document management system is provided which includes: a scanner having a user interface, a network interface, and an optical interface for generating a digital image file from a printed document; a cloud based platform disposed remotely from the scanner, the platform having a computing component and a storage component; and an application programming interface (API) configured to facilitate interaction between the scanner and the platform.

In an embodiment, the scanner is configured to receive an editing command at the user interface and to transmit a corresponding editing instruction to the API using the network interface, and the API is configured to retrieve the digital image file from a first location within the storage component; execute the editing instruction on the retrieved digital image file; and store the edited digital image file in a second location within the storage component.

In an embodiment, the scanner is configured to receive a send command including a destination input by a user and to transmit a corresponding send instruction to the API; and the API is configured to retrieve a PDF embodying the edited digital image file from the storage component and to send the PDF to the destination.

In an embodiment, the API is configured to invoke an optical character recognition (OCR) function to extract text from the edited digital image file, and store the extracted text in the PDF.

A scanner is configured to communicate over a network with a remote document management platform and an associated application programming interface (API). In an embodiment, the scanner is configured to: scan a printed document; generate a digital image file corresponding to the printed document; store the digital image file locally; send an upload request to the API; receive a URL from the API in response to the upload request; and upload the digital image file directly to a predetermined location within the platform defined by the URL.

In an embodiment, the scanner is further configured to receive confirmation from the API when the digital image file is uploaded, and display a first thumbnail corresponding to the uploaded digital image file.

In an embodiment, the scanner is further configured to receive a page model ID corresponding to the uploaded digital image file from the API.

In an embodiment, the scanner is further configured to receive metadata corresponding to the uploaded digital image file from the API.

In an embodiment, the scanner is further configured to receive a request from a user to edit the digital image file, and transmit a corresponding edit instruction to the API along with the URL.

In an embodiment, the scanner is further configured to receive a second URL from the API identifying the location within the platform at which an edited version of the digital image file is stored.

In an embodiment, the scanner is further configured to display a second thumbnail corresponding to the edited version of the digital image file.

In an embodiment, the scanner is further configured to prompt a user to: scan additional printed documents; upload additional digital image files; and request additional edits.

In an embodiment, the scanner is further configured to receive from the API: respective thumbnail URLs for each additional uploaded digital image file; and respective thumbnail URLs for each additional edited version of a digital image file.

In an embodiment, the scanner is further configured to: display respective thumbnails for each additional uploaded digital image file; and display respective thumbnails for each additional edited version of a digital image file.

In an embodiment, the scanner is further configured to: receive a send request input by a user; and, in response to the send request, instruct the API to send a completed PDF to a user selected destination.

In an embodiment, the user selected destination comprises at least one of a USB drive, an email server, and a cloud storage location.

In an embodiment, the scanner further includes an automatic document feeder (ADF) configured to scan printed documents.

In an embodiment, the scanner further includes: a user interface configured to receive an upload request, an edit request, and a send request; and a display screen configured to display the thumbnails.

In an embodiment, the scanner further includes a network interface configured to support wired and wireless communication with the platform and the API.

In an embodiment, the scanner further includes a processor configured to execute a middleware layer including a plurality of plug-ins configured to operate the ADF, the user interface, and the network interface.

In an embodiment, the scanner is further configured to bypass the API and upload image data files directly to the platform using the URLs.

A method of operating a scanner of the type configured to communicate over a network with a remote document management platform and an associated application programming interface (API) is provided. The method includes: scanning a printed document; generating a digital image file corresponding to the printed document; storing the digital image file locally; sending an upload request to the API; receiving a URL from the API in response to the upload request; and uploading the digital image file directly to the location within the platform specified by the URL.

In an embodiment, the method further includes receiving, from the API, a new URL for each additional upload request and each additional edited version of a digital image file.

In an embodiment, the method further includes receiving, from the API, a new thumbnail URL for each additional edited version of a digital image file.

A document scanner is provided which includes a cloud computing platform having a cloud application programming interface (API) and a cloud storage system, and a scanning device communicatively coupled over a network to the API and the cloud storage system. The scanning device is configured to: accept paper documents; generate a digital image file corresponding to each document; store the digital image files; upload the digital image files directly to the cloud storage system; receive, via a user interface module coupled to the scanning device, a first document editing command from a user, wherein the first document editing command is selected by the user from a list of commands including: page crop, page rotation, page zoom, remove pages, combine pages, and reorder pages; and send, to the cloud API, a first request to edit a first digital image file in accordance with a document editing command.

In an embodiment, the scanner is further configured to receive an edited version of the first digital image from the API.

In an embodiment, the scanner is further configured to receive a first thumbnail URL from the API representing the location within the cloud storage system at which a first thumbnail of the edited version of the first digital image is stored.

In an embodiment, the scanner is further configured to display the first thumbnail of the edited version of the first digital image.

In an embodiment, the scanner is further configured to: receive a second document editing command from a user; and send, to the API, a second request to edit a second digital image file.

In an embodiment, the scanner is further configured to receive an edited version of the second digital image from the API.

In an embodiment, the scanner is further configured to receive a second thumbnail URL from the API representing the location within the cloud storage system at which a second thumbnail of the edited version of the second digital image is stored.

In an embodiment, the scanner is further configured to display the second thumbnail of the edited version of the second digital image.

In an embodiment, the scanner is further configured to: prompt the user request additional edits to a previously edited digital image; and prompt the user request a first edit to a previously unedited digital image.

In an embodiment, the scanner is further configured to: receive a new thumbnail URL from the API for each additional edit to a previously edited digital image; and receive a new thumbnail URL from the API for each new edit to a previously unedited digital image.

In an embodiment, the scanner is further configured to display the thumbnail corresponding to the most current version of each digital image file.

In an embodiment, displaying the most current thumbnail comprises replacing the previously displayed thumbnail with a more recent thumbnail for each digital image file.

In an embodiment, the scanner is further configured to prompt the user to undo an edit.

In an embodiment, the scanner is further configured to, in response to a user request to undo an edit, replace the currently displayed thumbnail with a previously displayed thumbnail for a particular digital image file.

In an embodiment, replacing a currently displayed thumbnail with a previously displayed thumbnail comprises transmitting a previous thumbnail URL to the API and, in response, receiving and displaying the thumbnail image stored at the location defined by the previous thumbnail URL.

A system is provided for editing scanned documents using an image processing platform disposed remotely from the scanner. The system includes: a scanner having a user interface and an optical interface for generating a digital image file from a printed document; an image processing platform disposed remotely from the scanner; and an application programming interface (API) disposed at the platform and configured to facilitate interaction between the scanner and the platform. In an embodiment: the scanner is configured to receive an editing command at the user interface and to transmit a corresponding editing instruction to the API; and the API is configured to retrieve the digital image file from a first URL within the platform; process the editing instruction; and store the edited digital image file at a second URL within the platform.

In an embodiment, the scanner is configured to: receive the edit command at a user interface associated with the scanner; and transmit a corresponding edit instruction to the API along with the first URL.

In an embodiment, the scanner is further configured to receive the second URL from the API identifying the location within the platform at which an edited version of the digital image file is stored.

In an embodiment, the scanner is further configured to retrieve a second thumbnail from the second thumbnail URL.

In an embodiment, the scanner is further configured to display the second thumbnail.

A document scanning system is provided which includes a cloud computing platform, a scanning device communicatively coupled over a network to the cloud computing platform, and an application programming interface (API) configured to facilitate interaction between the scanner and the platform. In an embodiment, the scanning device is configured to: scan a printed document; generate a digital image file corresponding to the printed document; create an interim thumbnail representative of the scanned document; and display the interim thumbnail.

In an embodiment, the scanner is configured to upload the digital image file directly to the cloud storage system.

In an embodiment, upon uploading of the digital image file the cloud computing platform is configured to generate a first thumbnail representative of the uploaded digital image file and sends the first thumbnail to the scanning device.

In an embodiment, the scanner is configured to replace the interim thumbnail with the first thumbnail.

In an embodiment, the scanner comprises a touch screen display, and replacing the interim thumbnail with the first thumbnail comprises substituting the first thumbnail for the interim thumbnail on the touch screen display.

In an embodiment, the touch screen display is configured to receive a user request to edit the digital image file and to transmit a corresponding edit instruction to the API, and the API is configured to process the edit instruction and return a second thumbnail to the scanner corresponding to the edited image.

In an embodiment, upon receipt of the second thumbnail, the canner is configured to replace the first thumbnail with the second thumbnail on the touch screen display.

In an embodiment, the scanner is further configured to: prompt the user to scan additional documents and upload additional corresponding image data files; prompt the user to request additional editing of previously edited and previously unedited image data files; and for each additional edited image data file, display the then current thumbnail.

In an embodiment, displaying the then current thumbnail comprises receiving, by the scanner from the API, a new thumbnail URL for each edited image.

In an embodiment, the scanner is further configured to: prompt the user to undo an edit; and in response to a user request to undo an edit, replace the currently displayed thumbnail with a previously displayed thumbnail.

In an embodiment, replacing a currently displayed thumbnail with a previously displayed thumbnail comprises: transmitting a previous thumbnail URL to the API by the scanner; and receiving and displaying, by the scanner, the thumbnail image stored at the location defined by the previous thumbnail URL.

In an embodiment, the API is further configured to, upon completion of the upload, generate a page model for the digital image file.

In an embodiment, the API is further configured to, upon completion of the upload, generate a request to perform optical character recognition (OCR) to extract test from the digital image file.

In an embodiment, the API is configured populate the page model with the extracted text.

In an embodiment, the API is configured populate the page model with a path to each thumbnail URL.

In an embodiment, the API is configured to generate portable document format (PDF) documents corresponding to the processed image files upon completion of all editing requests.

In an embodiment, generating the PDF comprises layering the extracted text into the PDF in a searchable format.

In an embodiment, the API is configured to store the extracted text in JSON string format in a document file.

A system for editing scanned documents while displaying current thumbnails to the user is provided. The system includes: a cloud computing platform, a scanning device communicatively coupled over a network to the cloud computing platform, and an application programming interface (API) configured to facilitate interaction between the scanner and the platform. In an embodiment, the scanning device is configured to: scan a printed document; generate a digital image file corresponding to the printed document; create an interim thumbnail representative of the scanned document; and display the interim thumbnail. In an embodiment: upon uploading of the digital image file the API is configured to invoke a process for generating a first thumbnail representative of the uploaded digital image file and send the first thumbnail to the scanning device; and the scanning device is configured to replace the interim thumbnail with the first thumbnail.

In an embodiment, the scanner is further configured to: prompt the user to scan additional documents and upload additional corresponding image data files; prompt the user to request additional editing of previously edited and previously unedited image data files; and for each additional edited image data file, display the then current thumbnail.

A document scanning device is provided which includes: a processing module and an image sensor communicatively coupled to the processing module. In an embodiment, the image sensor and processing module cooperate to: optically scan a set of printed documents; determine a duplex/simplex attribute for each document; generate a digital image file for each document; assemble a data file comprising the digital image files and their respective simplex/duplex attributes; and upload the data file directly to a remote image processing platform communicatively coupled to the processing module over a network.

In an embodiment, the device is further configured to instruct the platform to: process the data file into a PDF; and configure the PDF based on the simplex/duplex attributes.

In an embodiment, one component of the simplex/duplex attribute is based on whether a document has printed matter on one side or on both sides.

In an embodiment, a document having printed matter on only one side is assigned a simplex/duplex attribute corresponding to simplex.

In an embodiment, a document having printed matter on both sides is assigned a simplex/duplex attribute corresponding to duplex.

In an embodiment, determining a duplex/simplex attribute comprises: optically scanning a first side of a document to determine if the first side includes printed matter; and optically scanning a second side of the document to determine if the second side includes printed matter.

In an embodiment, printed matter includes textual elements.

In an embodiment, printed matter includes non-textual elements.

In an embodiment, printed matter includes at least one of alphanumeric characters; graphical elements; symbols; designs; watermarks; texture; artwork; colors; hues; color gradients; thematic gradients; shadowing; absolute contrasts; contrasts exceeding a static threshold; contrasts exceeding a dynamic threshold; patterns; holograms; illusions; geometric forms; irregular forms; subliminal messaging; non-white space; absolute heterogeneity; heterogeneity exceeding a static threshold; heterogeneity exceeding a dynamic threshold; quantifiable variances in a visual attribute within a single document; and quantifiable variances in a visual attribute from one document to another.

In an embodiment, the processor is configured to instruct the platform to: generate a single sided PDF for an image file determined to exhibit a simplex attribute; and generate a double sided PDF for an image file determined to exhibit a duplex attribute.

In an embodiment, the processor is configured to instruct the platform to configure the PDF such that substantially all pages in the PDF shall have printed matter on both sides, if at least a predetermined threshold percentage of the documents in the data file exhibit a duplex attribute.

In an embodiment, the processor is configured to instruct the platform to configure the PDF such that: documents in the data file which exhibit a duplex attribute are to be represented in the PDF as duplex; and documents in the data file which exhibit a simplex attribute manifest are to be represented in the PDF as simplex.

In an embodiment, the processor is configured to instruct the platform to configure the PDF such that substantially all pages in the PDF shall have printed matter on both sides, even if substantially none of the documents in the data file exhibit a duplex attribute.

In an embodiment, the scanner is configured to: receive a send request from a user; in response to the send request, instruct the platform to assemble a PDF in accordance with the simplex/duplex attributes contained in the data file; and transmit the resulting PDF to a user selected destination.

A method of rendering a PDF derived from a plurality of printed documents is provided. The method includes the steps of: optically scanning each of the plurality of printed documents; determining a duplex/simplex attribute for each scanned document; generating a digital image file for each scanned document; assembling a data file comprising the digital image files and their respective simplex/duplex attributes; uploading the data file to a remote image processing platform; and instructing the platform to configure the PDF based on the simplex/duplex attributes.

In an embodiment, determining comprises: optically scanning a first side of a document to determine if the first side exhibits printed matter; and optically scanning a second side of the document to determine if the second side exhibits printed matter.

In an embodiment, determining comprises: assigning a simplex/duplex attribute value of "simplex" to digital image files derived from a document which exhibits printed matter on only one side; and assigning a simplex/duplex attribute value of "duplex" to digital image files derived from a document which exhibits printed matter on both sides.

In an embodiment, the method further includes: receiving a send request from a user; in response to the send request, instructing the platform to assemble a PDF in accordance with the simplex/duplex attributes contained in the data file; and instructing the platform transmit the resulting PDF to a user selected destination.

In an embodiment, the processor is configured to instruct the platform to configure the PDF such that substantially all pages in the PDF shall have printed matter on both sides, even if substantially none of the documents in the data file exhibit a duplex attribute.

In an embodiment, the processor is configured to instruct the platform to configure the PDF such that: documents in the data file which exhibit a duplex attribute are to be represented in the PDF as duplex; and documents in the data file which exhibit a simplex attribute manifest are to be represented in the PDF as simplex.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms "module" or "controller" refer to any hardware, software, firmware, electronic control component, processing logic, and/or processor device, individually or in any combination, including without limitation: application specific integrated circuits (ASICs), field-programmable gate-arrays (FPGAs), dedicated neural network devices (e.g., Google Tensor Processing Units), electronic circuits, processors (shared, dedicated, or group) configured to execute one or more software or firmware programs, a combinational logic circuit, and/or other suitable components that provide the described functionality.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A document scanning system comprising:
   a cloud computing platform;
   a scanning device communicatively coupled over a network to the cloud computing platform, the scanning device configured to:
   scan a printed document;
   generate a digital image file corresponding to the printed document;
   create an interim thumbnail representative of the scanned document; and
   display the interim thumbnail; and
   an application programming interface (API) configured to facilitate interaction between the scanner and the platform;
   wherein the scanner is configured to upload the digital image file directly to the cloud storage system and the cloud computing platform is configured to then generate a first thumbnail representative of the uploaded digital image file and send the first thumbnail to the scanning device.

2. The system of claim 1, wherein the scanner is configured to replace the interim thumbnail with the first thumbnail.

3. The system of claim 1, wherein:
   the scanner comprises a touch screen display; and
   replacing the interim thumbnail with the first thumbnail comprises substituting the first thumbnail for the interim thumbnail on the touch screen display.

4. The system of claim 3, wherein:
   the touch screen display is configured to receive a user request to edit the digital image file and to transmit a corresponding edit instruction to the API; and
   the API is configured to process the edit instruction and return a second thumbnail to the scanner corresponding to the edited image.

5. The system of claim 4, wherein:
   upon receipt of the second thumbnail, the scanner is configured to replace the first thumbnail with the second thumbnail on the touch screen display.

6. The system of claim 5, wherein the scanner is further configured to:
   prompt the user to scan additional documents and upload additional corresponding image data files;
   prompt the user to request additional editing of previously edited and previously unedited image data files; and
   for each additional edited image data file, display the then current thumbnail.

7. The system of claim 6, wherein displaying the then current thumbnail comprises receiving, by the scanner from the API, a new thumbnail URL for each edited image.

8. The system of claim 5, wherein the scanner is further configured to:
   prompt the user to undo an edit; and
   in response to a user request to undo an edit, replace the currently displayed thumbnail with a previously displayed thumbnail.

9. The system of claim 8, wherein replacing a currently displayed thumbnail with a previously displayed thumbnail comprises:
   transmitting a previous thumbnail URL to the API by the scanner; and
   receiving and displaying, by the scanner, the thumbnail image stored at the location defined by the previous thumbnail URL.

10. The system of claim 1, wherein the API is further configured to, upon completion of the upload, generate a page model for the digital image file.

11. The system of claim 10, wherein the API is further configured to, upon completion of the upload, generate a request to perform optical character recognition (OCR) to extract test from the digital image file.

12. The system of claim 11, wherein the API is configured populate the page model with the extracted text.

13. The system of claim 12, wherein the API is configured populate the page model with a path to each thumbnail URL.

14. The system of claim 13, wherein the API is configured to generate portable document format (PDF) documents corresponding to the processed image files upon completion of all editing requests.

15. The system of claim 14, wherein generating the PDF comprises layering the extracted text into the PDF in a searchable format.

16. The system of claim 14, wherein the API is configured to store the extracted text in JSON string format in a document file.

17. A system for editing scanned documents while displaying current thumbnails to the user, the system comprising:
   a cloud computing platform;
   a scanning device communicatively coupled over a network to the cloud computing platform, the scanning device configured to:
   scan a printed document;
   generate a digital image file corresponding to the printed document;
   create an interim thumbnail representative of the scanned document; and
   display the interim thumbnail; and
   an application programming interface (API) configured to facilitate interaction between the scanner and the platform;
   wherein:
   upon uploading of the digital image file the API is configured to invoke a process for generating a first thumbnail representative of the uploaded digital image file and send the first thumbnail to the scanning device; and
   the scanning device is configured to replace the interim thumbnail with the first thumbnail.

18. The system of claim 17, wherein the scanner is further configured to:
   prompt the user to scan additional documents and upload additional corresponding image data files;
   prompt the user to request additional editing of previously edited and previously unedited image data files; and
   for each additional edited image data file, display the then current thumbnail.

\* \* \* \* \*